(12) United States Patent
Gleason-Chapell et al.

(10) Patent No.: US 12,157,566 B2
(45) Date of Patent: Dec. 3, 2024

(54) SHORTENING WINGSPAN OF AN AIRCRAFT

(71) Applicant: The Boeing Company, Chicago, IL (US)

(72) Inventors: Keily Madison Gleason-Chapell, Seattle, WA (US); Mark Steven Good, Seattle, WA (US); Paul Dees, Snohomish, WA (US)

(73) Assignee: The Boenig Company, Arlington, VA (US)

( * ) Notice: Subject to any disclaimer, the term of this patent is extended or adjusted under 35 U.S.C. 154(b) by 46 days.

(21) Appl. No.: 18/073,403

(22) Filed: Dec. 1, 2022

(65) Prior Publication Data

US 2024/0182154 A1   Jun. 6, 2024

(51) Int. Cl.
*B64C 3/56*  (2006.01)

(52) U.S. Cl.
CPC ...................... *B64C 3/56* (2013.01)

(58) Field of Classification Search
CPC .... B64C 3/56; B64C 3/38; B64C 3/44; B64C 3/54; B64C 3/546; B64C 23/072
See application file for complete search history.

(56) References Cited

U.S. PATENT DOCUMENTS

| 1,928,523 | A |   | 9/1933 | Bally |
| 2,056,188 | A | * | 10/1936 | Hayden ................ B64C 3/54 |
|   |   |   |   |   244/218 |
| 2,402,733 | A |   | 6/1946 | Cooley |
| 3,138,354 | A |   | 6/1964 | Baetke |
| 3,421,718 | A | * | 1/1969 | Gehringer ............. F15B 15/082 |
|   |   |   |   |   92/88 |
| 8,708,286 | B2 |   | 4/2014 | Sakurai et al. |
| 9,950,780 | B2 |   | 4/2018 | Santini et al. |
| 10,583,909 | B2 |   | 3/2020 | Alexander et al. |

(Continued)

FOREIGN PATENT DOCUMENTS

| CN | 115009507 A |   | 9/2022 |   |
| CN | 113665790 B | * | 3/2023 |   |
| GB | 2535580 A | * | 8/2016 | ........... B64C 23/072 |

OTHER PUBLICATIONS

United States Patent and Trademark Office, Office Action Issued in U.S. Appl. No. 18/073,414, filed Apr. 10, 2024, 16 pages.

(Continued)

*Primary Examiner* — Joshua J Michener
*Assistant Examiner* — Ryan Andrew Yankey
(74) *Attorney, Agent, or Firm* — Alleman Hall & Tuttle LLP

(57) ABSTRACT

According to one aspect of the present disclosure, an apparatus for shortening a wingspan of an aircraft is disclosed. The apparatus comprises a first track affixed to a fixed wing of the aircraft. A first roller assembly is affixed to a wingtip of the aircraft, with the first roller assembly moveably captured within the first track. A second track is also affixed to the fixed wing. A second roller assembly is affixed to the wingtip and is moveably captured within the second track. A wingtip actuation assembly is configured to translate the first roller assembly within the first track and the second roller assembly within the second track to move the wingtip between an extended position and a stowed position under the fixed wing.

20 Claims, 24 Drawing Sheets

(56) References Cited

U.S. PATENT DOCUMENTS

| | | | |
|---|---|---|---|
| 11,492,102 B2 | 11/2022 | Xi et al. | |
| 11,780,554 B2 * | 10/2023 | Everaert | B64C 9/16 |
| | | | 244/214 |
| 2013/0056579 A1 * | 3/2013 | Schlipf | B64C 3/56 |
| | | | 244/49 |
| 2016/0167092 A1 | 6/2016 | Gaw | |
| 2016/0251075 A1 * | 9/2016 | Thompson | B64C 23/072 |
| | | | 244/198 |
| 2017/0137110 A1 * | 5/2017 | Harding | B64U 30/12 |
| 2017/0137111 A1 * | 5/2017 | Harding | B64C 3/56 |
| 2019/0337605 A1 | 11/2019 | Lorenz | |
| 2020/0079491 A1 | 3/2020 | Gruner et al. | |
| 2023/0129220 A1 * | 4/2023 | Edwards | B64C 3/185 |
| | | | 244/49 |
| 2023/0382513 A1 * | 11/2023 | Bate | B64C 23/072 |

OTHER PUBLICATIONS

United States Patent and Trademark Office, Office Action Issued in U.S. Appl. No. 18/191,761, filed Jun. 21, 2024, 29 pages.

* cited by examiner

```
                                    ┌─────────────────────────────────────────────────────────────────┐
200                                 │ PROVIDING AN APPARATUS CONFIGURED TO MOVE A WINGTIP UNDER A     │
                                    │ FIXED WING OF THE AIRCRAFT, THE APPARATUS COMPRISING: A FIRST   │
                                    │ TRACK AFFIXED TO THE FIXED WING OF THE AIRCRAFT; A FIRST ROLLER │
                                    │ ASSEMBLY AFFIXED TO THE WINGTIP OF THE AIRCRAFT, THE FIRST      │── 204
                                    │ ROLLER ASSEMBLY MOVEABLY CAPTURED WITHIN THE FIRST TRACK;       │
                                    │ A SECOND TRACK AFFIXED TO THE FIXED WING; AND A SECOND          │
                                    │ ROLLER ASSEMBLY AFFIXED TO THE WINGTIP, THE SECOND ROLLER       │
                                    │ ASSEMBLY MOVEABLY CAPTURED WITHIN THE SECOND TRACK              │
                                    └─────────────────────────────────────────────────────────────────┘
                                                                    │
                                                                    ▼
                                    ┌─────────────────────────────────────────────────────────────────┐
                                    │ POSITIONING THE WINGTIP AT AN OUTBOARD END OF THE FIXED WING    │── 208
                                    └─────────────────────────────────────────────────────────────────┘
                                                                    │
                                                                    ▼
                                    ┌─────────────────────────────────────────────────────────────────┐
                                    │ MOVING THE WINGTIP UNDER THE FIXED WING BY MOVING THE FIRST     │
                                    │ ROLLER ASSEMBLY WITHIN THE FIRST TRACK AND MOVING THE SECOND    │── 212
                                    │ ROLLER ASSEMBLY WITHIN THE SECOND TRACK                         │
                                    └─────────────────────────────────────────────────────────────────┘
```

FIG. 25

SHORTENING WINGSPAN OF AN AIRCRAFT

FIELD

The present disclosure relates generally to the field of aircraft, and more specifically to shortening the wingspan of an aircraft by moving a wingtip under a fixed wing.

BACKGROUND

In some examples, the wingspan of an aircraft can inhibit the free movement of the aircraft, such as preventing the aircraft from entering a hangar having a limited-width entryway. To address this issue, some aircraft utilize upwardly-folding wingtips that can temporarily reduce the aircraft's wingspan. As described in more detail below, the configurations described herein provide improved apparatuses for shortening an aircraft's wingspan.

SUMMARY

According to one aspect of the present disclosure, an apparatus for shortening a wingspan of an aircraft is disclosed. The apparatus includes a first track affixed to a fixed wing of the aircraft and a first roller assembly affixed to a wingtip of the aircraft, where the first roller assembly is moveably captured within the first track. A second track is also affixed to the fixed wing and a second roller assembly affixed to the wingtip, with the second roller assembly moveably captured within the second track. A wingtip actuation assembly is configured to translate the first roller assembly within the first track and the second roller assembly within the second track to move the wingtip between an extended position and a stowed position under the fixed wing.

In another aspect, an aircraft comprises a fixed wing extending from a fuselage, a wingtip moveably coupled to a distal end of the fixed wing, and an apparatus configured to move the wingtip under the fixed wing. The apparatus comprises a first track affixed to the fixed wing. A first roller assembly is affixed to the wingtip and is moveably captured within the first track. A second track is also affixed to the fixed wing. A second roller assembly is affixed to the wingtip and is moveably captured within the second track. A wingtip actuation assembly is configured to translate the first roller assembly within the first track and the second roller assembly within the second track to move the wingtip between an extended position and a stowed position under the fixed wing.

In another aspect, a method of shortening a wingspan of an aircraft is provided. The method comprises providing an apparatus configured to move a wingtip under a fixed wing of the aircraft. The apparatus comprises a first track affixed to the fixed wing of the aircraft and a first roller assembly affixed to the wingtip of the aircraft, where the first roller assembly is moveably captured within the first track. A second track is also affixed to the fixed wing and a second roller assembly affixed to the wingtip, with the second roller assembly moveably captured within the second track. The method includes positioning the wingtip at an outboard end of the fixed wing, and moving the wingtip under the fixed wing by moving the first roller assembly within the first track and moving the second roller assembly within the second track.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

FIG. 25 is a flowchart of an exemplary embodiment of a method of shortening a wingspan of an aircraft.

DETAILED DESCRIPTION

As noted above, in some examples the wingspan of an aircraft can inhibit its free movement into areas having dimensional restrictions. The configurations described herein provide improved apparatus for selectively shortening an aircraft's wingspan by moving a wingtip under a fixed wing. As described in more detail below, configurations of the present disclosure include components for safely moving and temporarily storing a wingtip under a fixed wing of an aircraft, as well as securing the wingtip in an extended position for flight.

Figure 1:
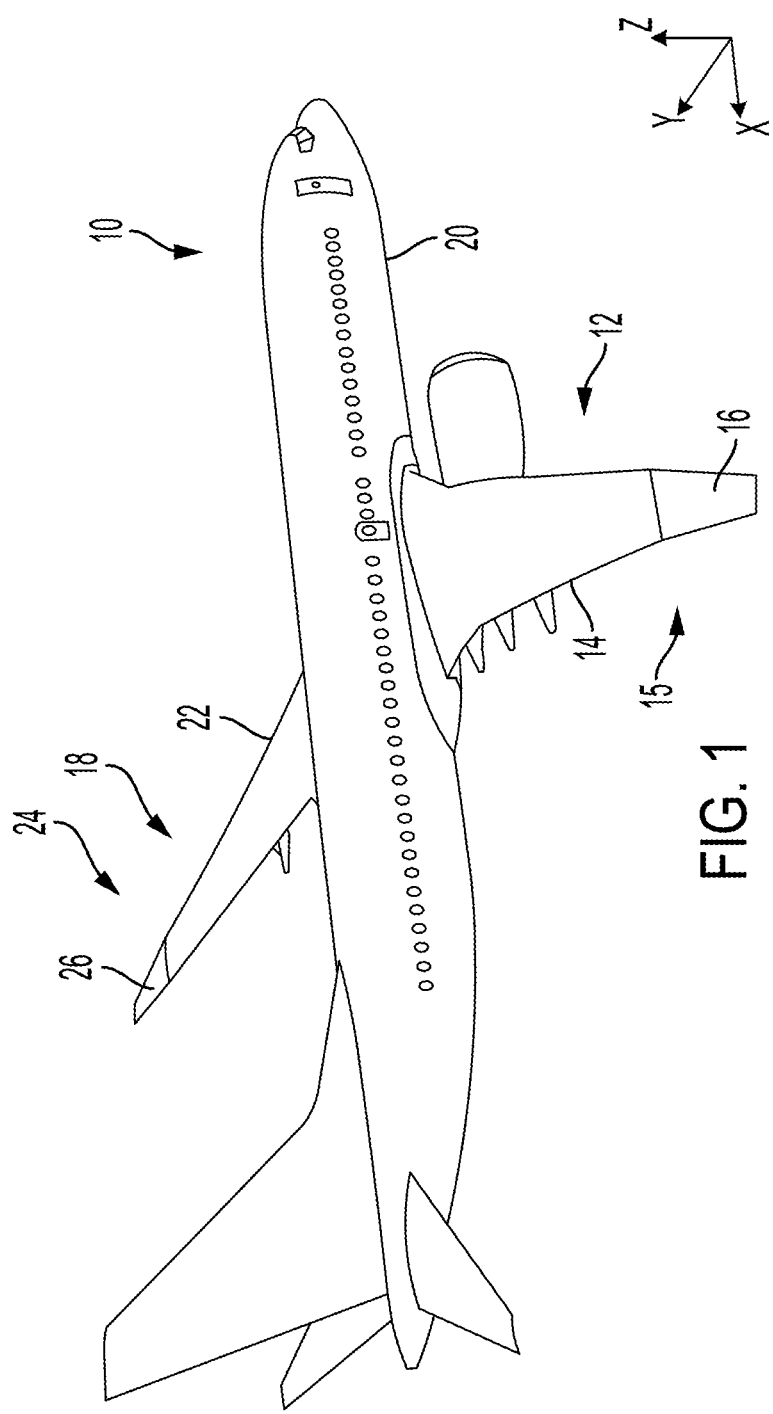
FIG. 1 is a representation of an exemplary embodiment of an aircraft configured to move its wingtips under fixed wings.
Figure 2:
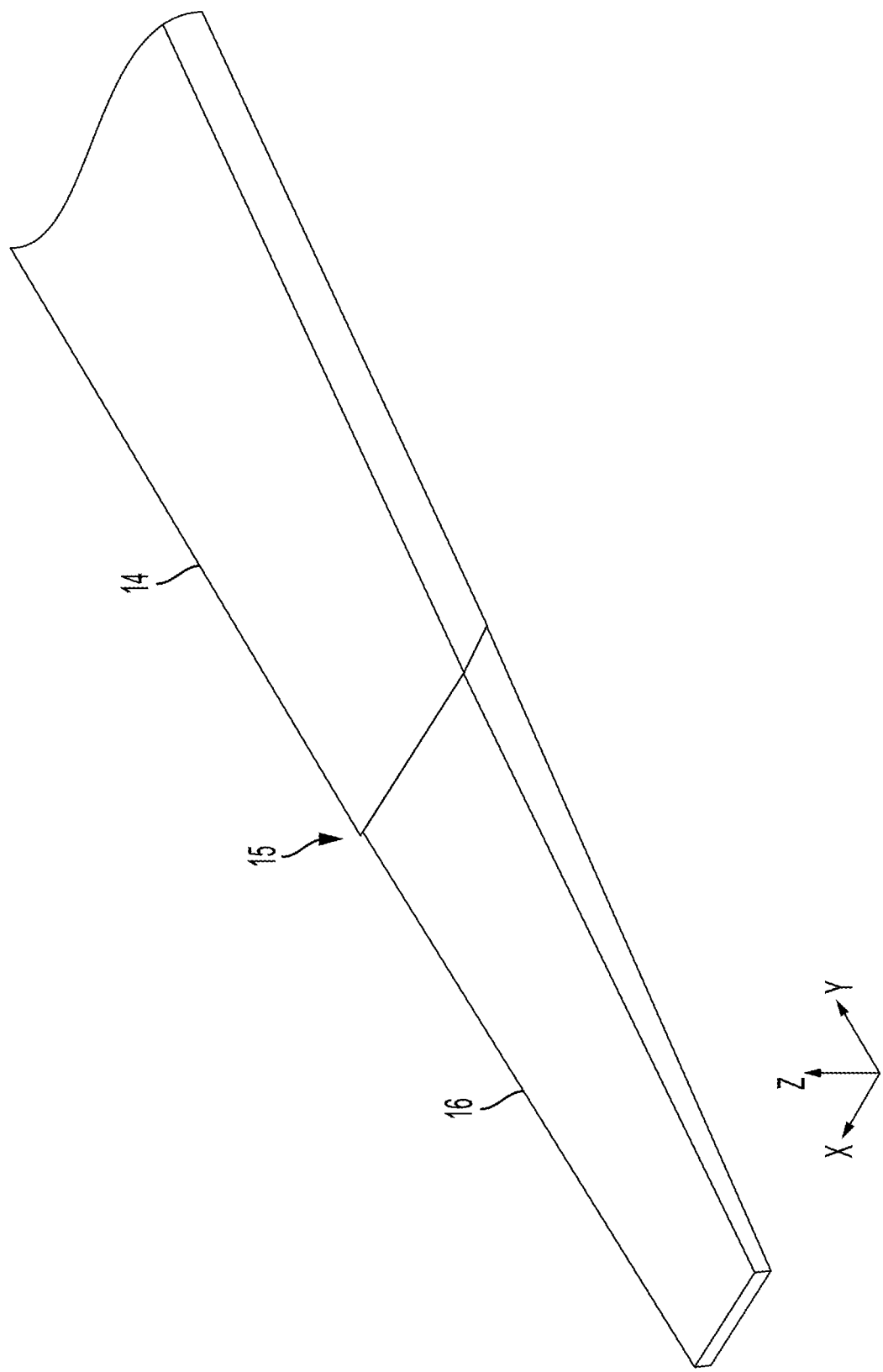
FIG. 2 shows a portion of the starboard wing of the aircraft of FIG. 1 with the wingtip in the extended position.

FIG. 1 is a diagrammatic representation of an exemplary embodiment of an aircraft 10 according to examples of the present disclosure. In other examples, the configurations and components of the present disclosure can be used with a wide variety of other aircraft having different form factors, sizes, and/or flight capabilities. The aircraft 10 comprises a fuselage 20, a starboard wing 12 and a port wing 18. In various examples, components of the aircraft 10 may be fabricated from metal, composite materials, polymeric materials, ceramic materials, and/or combinations thereof.

The fuselage 20 comprises an interior cabin that is configured to accommodate a payload, such as passengers and cargo. The starboard wing 12 and port wing 18 are coupled to the fuselage 20 and extend laterally from the fuselage. The starboard wing 12 comprises a starboard fixed wing 14 and a starboard wingtip 16. Similarly, the port wing 18 comprises a port fixed wing 22 and a port wingtip 26. As described in more detail below, the starboard wingtip 16 and the port wingtip 26 are coupled to their corresponding fixed wings in a manner that enables the wingtips to be moved from an extended position shown in FIG. 1 to a stowed position under their corresponding fixed wing (see FIG. 14).

FIGS. 2-6 show different views of portions of the starboard fixed wing 14 and the starboard wingtip 16 in the extended position, along with components of an apparatus 30 for moving the wingtip from the extended position to a stowed position under the fixed wing. FIGS. 7-14 show different views of the components of the apparatus 30. The following description of the starboard fixed wing 14, starboard wingtip 16, and the apparatus 30 configured to move the wingtip under the fixed wing applies equally to the port fixed wing 22 and port wingtip 26. In other examples, the apparatus 30 is configured to move the wingtip from the extended position to a stowed position above the fixed wing.

Figure 3:
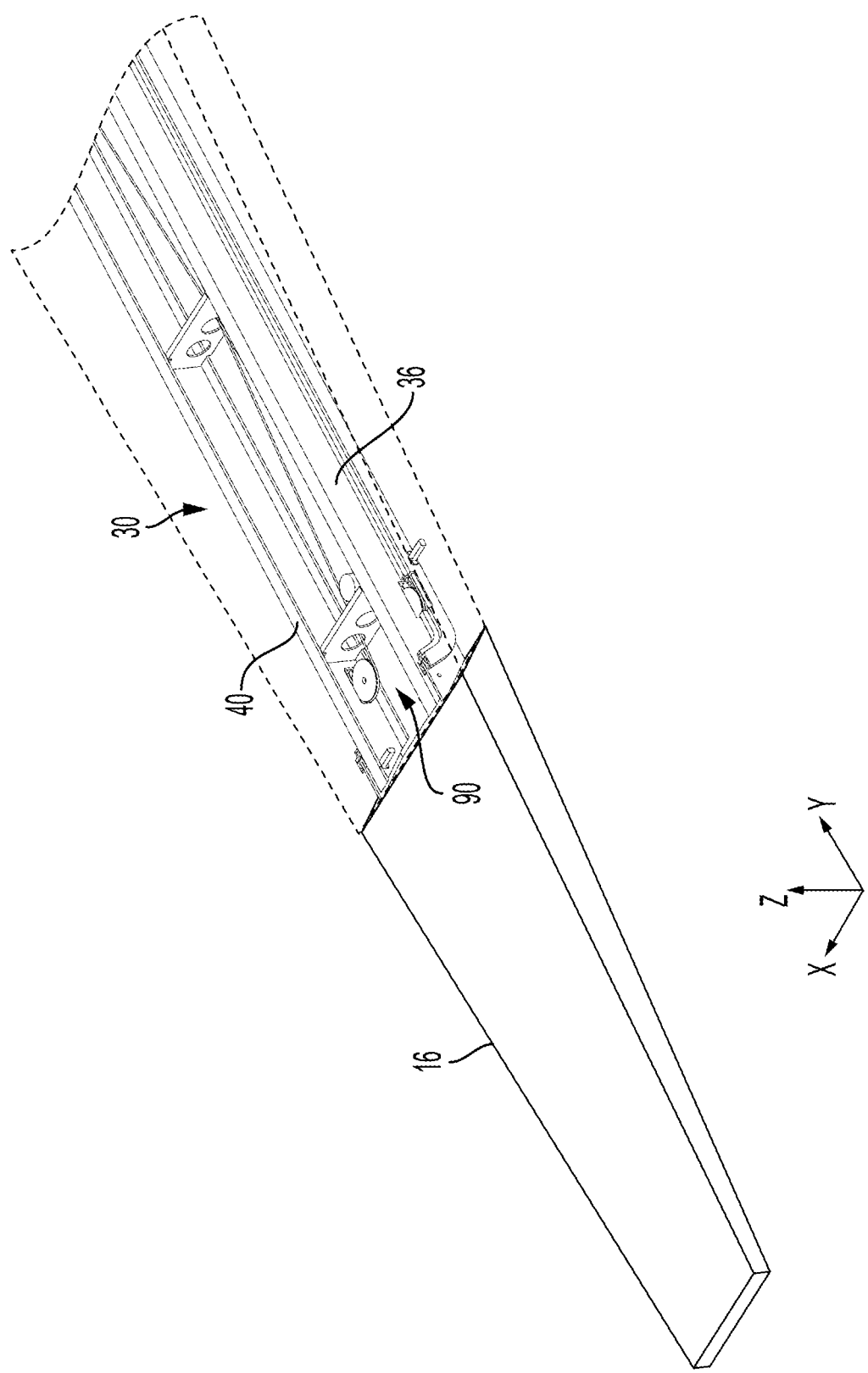
FIG. 3 shows the starboard wing of FIG. 2 with the fixed wing skins removed.
Figure 6:
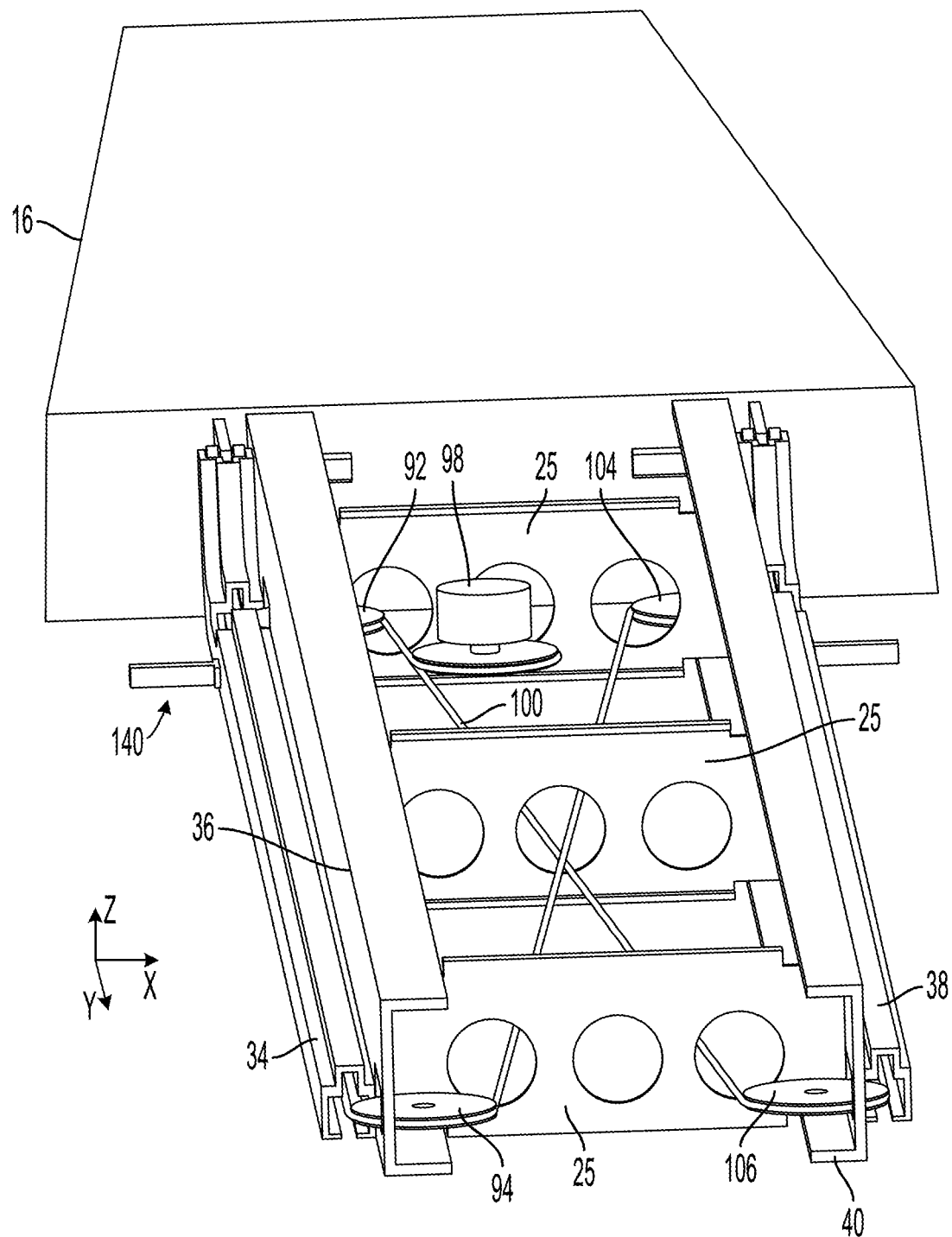
FIG. 6 is an end view of the fixed wing spars and components of the apparatus configured to move the wingtip under the fixed wing.

With reference to FIG. 3, the starboard fixed wing 14 includes a first spar 36 and second spar 40 that extend from the fuselage 20. As described in more detail below, the first spar 36 and second spar 40 provide structural support for components of the apparatus 30 that moves the starboard wingtip 16 under the starboard fixed wing 14. With reference to FIG. 6, a plurality of ribs 25 extend between the first spar 36 and second spar 40 to provide structural integrity to the starboard fixed wing 14.

With reference also to FIGS. 4, 9, 10 and 12, the apparatus 30 includes a first track 34 that is affixed to the starboard fixed wing 14 via the first spar 36. In this example the first track 34 is affixed to the first spar 36 via welding or any other suitable fastening method. In some examples, the first track 34 and first spar 36 may be fabricated as a single component, such as via additive manufacturing techniques. The apparatus 30 also includes a second track 38 that is similarly affixed to the starboard fixed wing 14 via the second spar 40.

Figure 9:
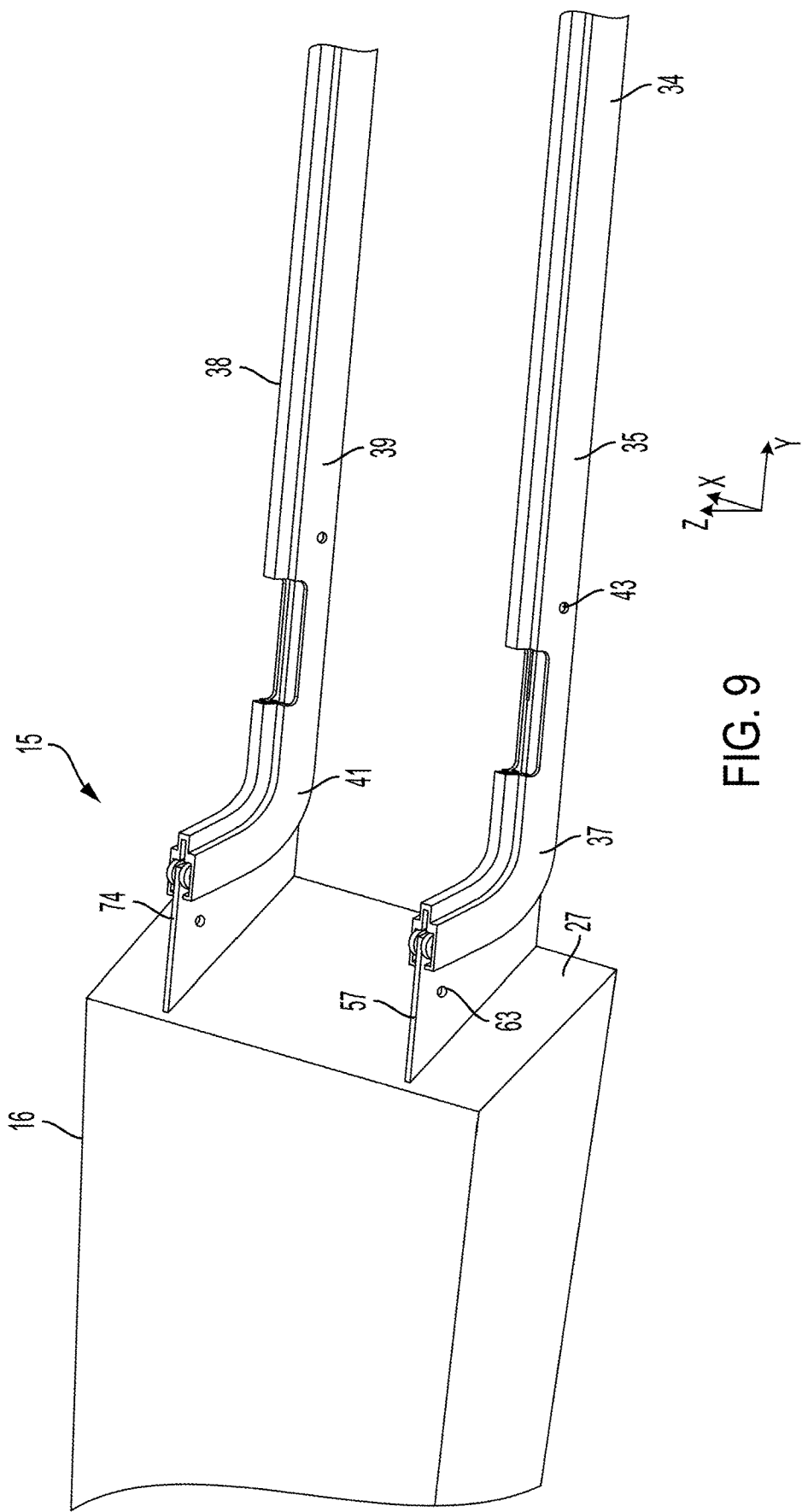
FIG. 9 shows the two tracks of the apparatus affixed to the wingtip via brackets.

With reference to FIG. 9, the first track 34 includes a first elongated linear portion 35 that transitions into a first upwardly-curving portion 37 that is proximal to the outboard end 15 of the starboard fixed wing 14. Similarly, the second track 38 includes a second elongated linear portion 39 that transitions into a second upwardly-curving portion 41 that is proximal to the outboard end 15 of the starboard fixed wing 14. In this example, the first and second elongated portions 35, 39 are parallel to one another. Advantageously, and as described in more detail below, providing two parallel elongated portions enables configurations of the present disclosure to smoothly transition a wingtip between the extended position and the stowed position under the fixed wing, and vice versa.

Figure 11:
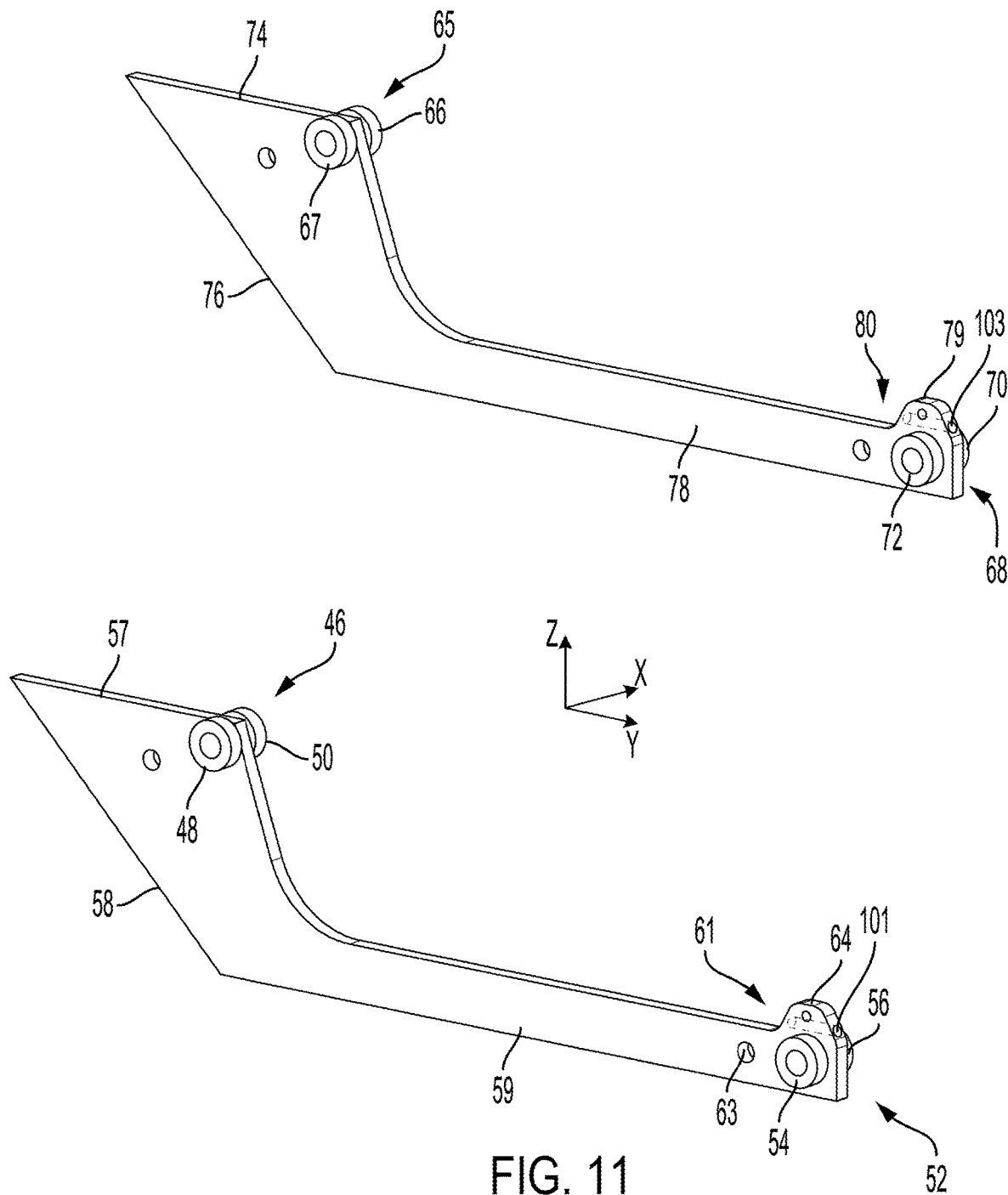
FIG. 11 shows the two brackets of the apparatus.
Figure 12:
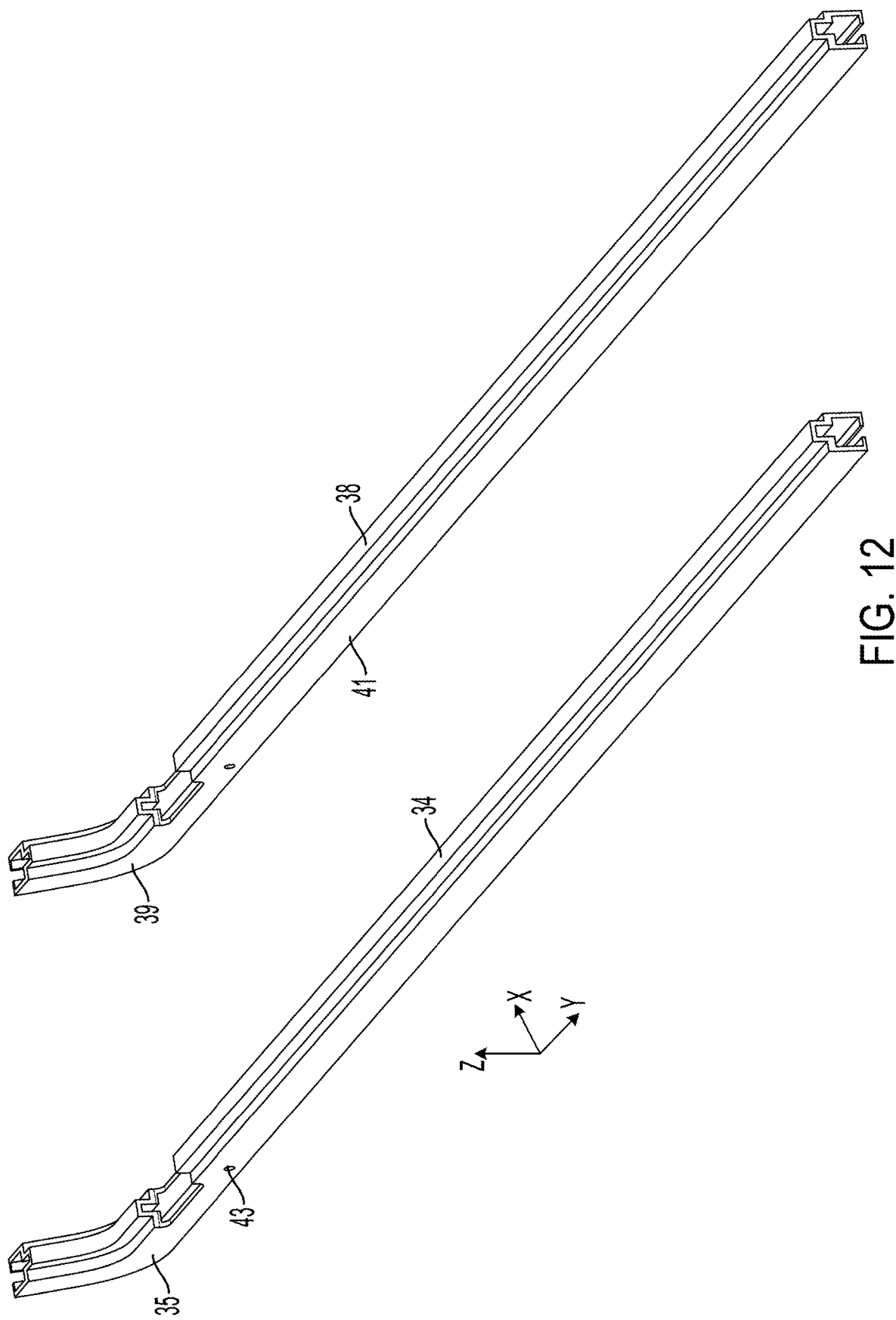
FIG. 12 shows a top view of the two tracks of the apparatus.

As described in more detail below, two roller assemblies are affixed to the starboard wingtip 16 via brackets attached to the starboard wingtip, with the two roller assemblies moveably captured within the first track 34 and second track 38 to enable the wingtip to move between the extended position and the stowed position. With reference now to FIG. 11, a first roller assembly includes a first outboard roller pair 46 consisting of a first outer roller 48 and a first inner roller 50 spaced laterally from the first outer roller. As shown in FIG. 11, the first outer roller 48 and first inner roller 50 are rotatably coupled to an inner corner portion of first bracket 57. With reference also to FIG. 9, a first attachment end 58 of the first bracket 57 is affixed to an inboard end 27 of the starboard wingtip 16.

Returning to FIG. 11, at a distal end 61 of a first arm 59 of the first bracket 57, the first roller assembly also includes a first inboard roller pair 52 consisting of a first outer roller 54 and a first inner roller 56 spaced laterally from the first outer roller. As shown in FIG. 11, the first outer roller 54 and first inner roller 56 are rotatably coupled to the distal end 61 of the first arm 59.

In a similar manner, the second roller assembly includes a second outboard roller pair 65 consisting of a second outer roller 66 and a second inner roller 67 spaced laterally from the second outer roller. As shown in FIG. 11, the second outer roller 66 and second inner roller 67 are rotatably coupled to an inner corner portion of second bracket 74. With reference also to FIG. 9, a second attachment end 76 of the second bracket 74 is affixed to the inboard end 27 of the starboard wingtip 16.

Returning to FIG. 11, at a distal end 80 of a second arm 78 of the second bracket 74, the second roller assembly also includes a second inboard roller pair 68 consisting of a second outer roller 70 and a second inner roller 72 spaced laterally from the second outer roller. As shown in FIG. 11, the second outer roller 70 and second inner roller 72 are rotatably coupled to the distal end 80 of the second arm 78.

Figure 7:
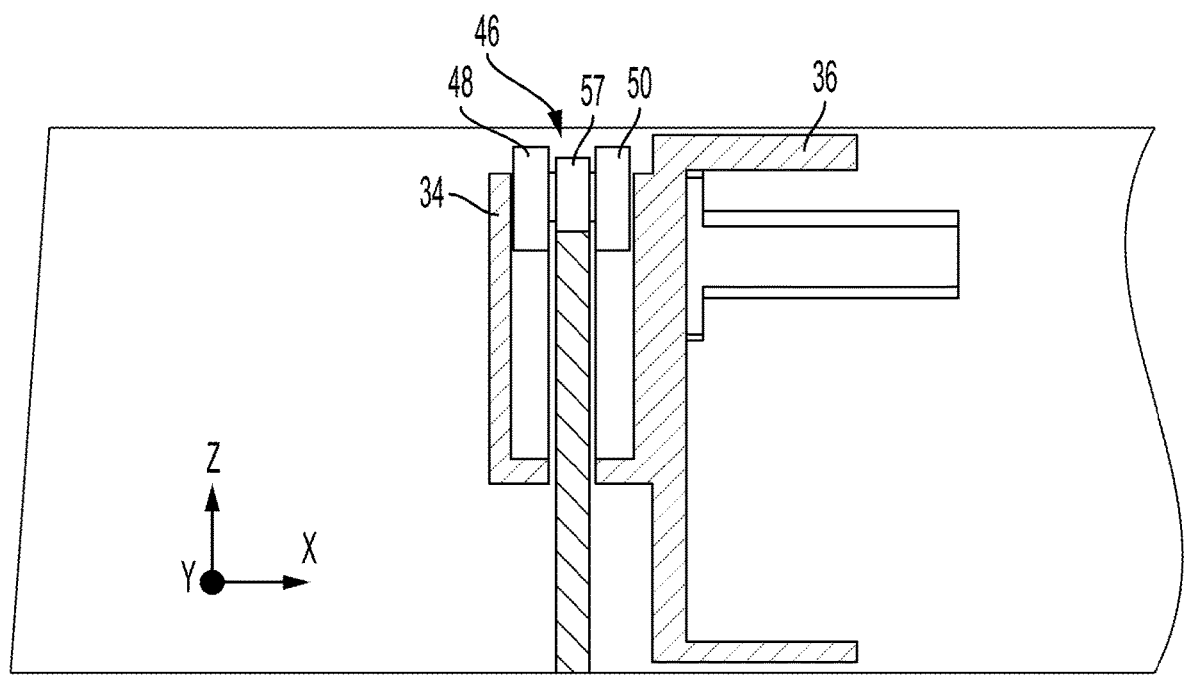
FIG. 7 is a cross-section view taken along line 7-7 in FIG. 4.
Figure 8:
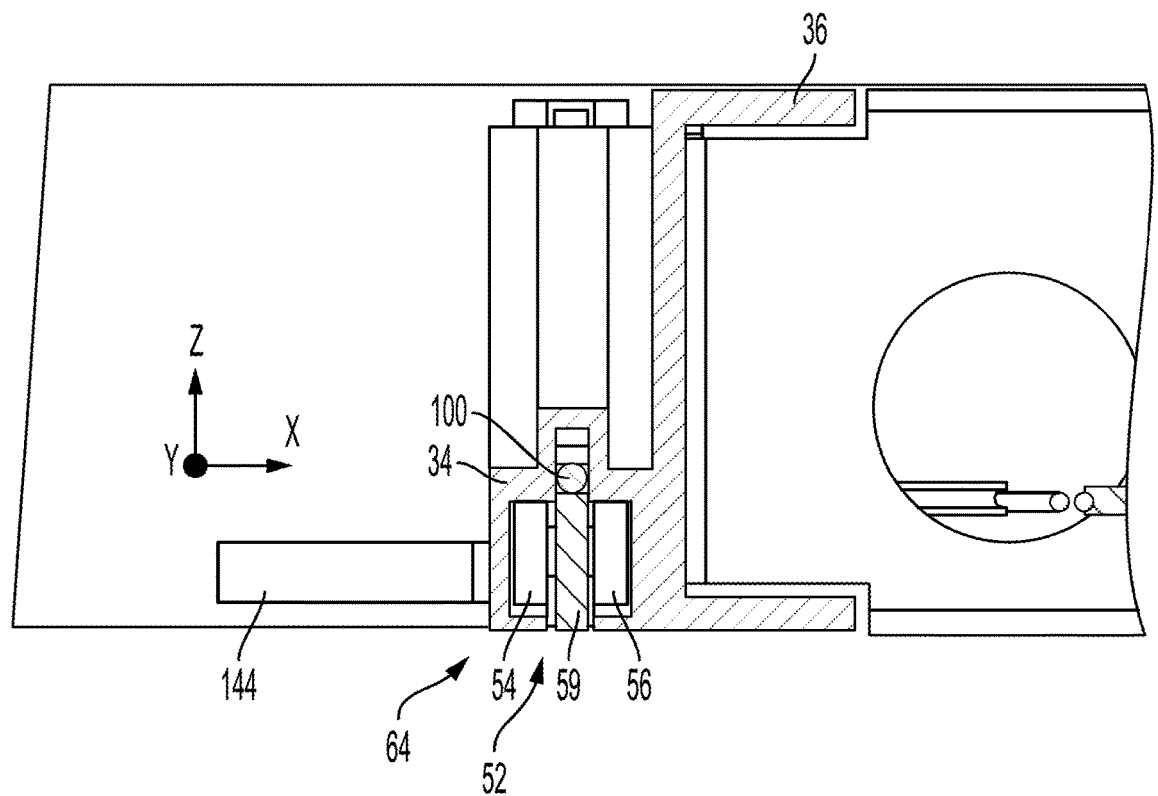
FIG. 8 is a cross-section view taken along line 8-8 in FIG. 4.
Figure 13:
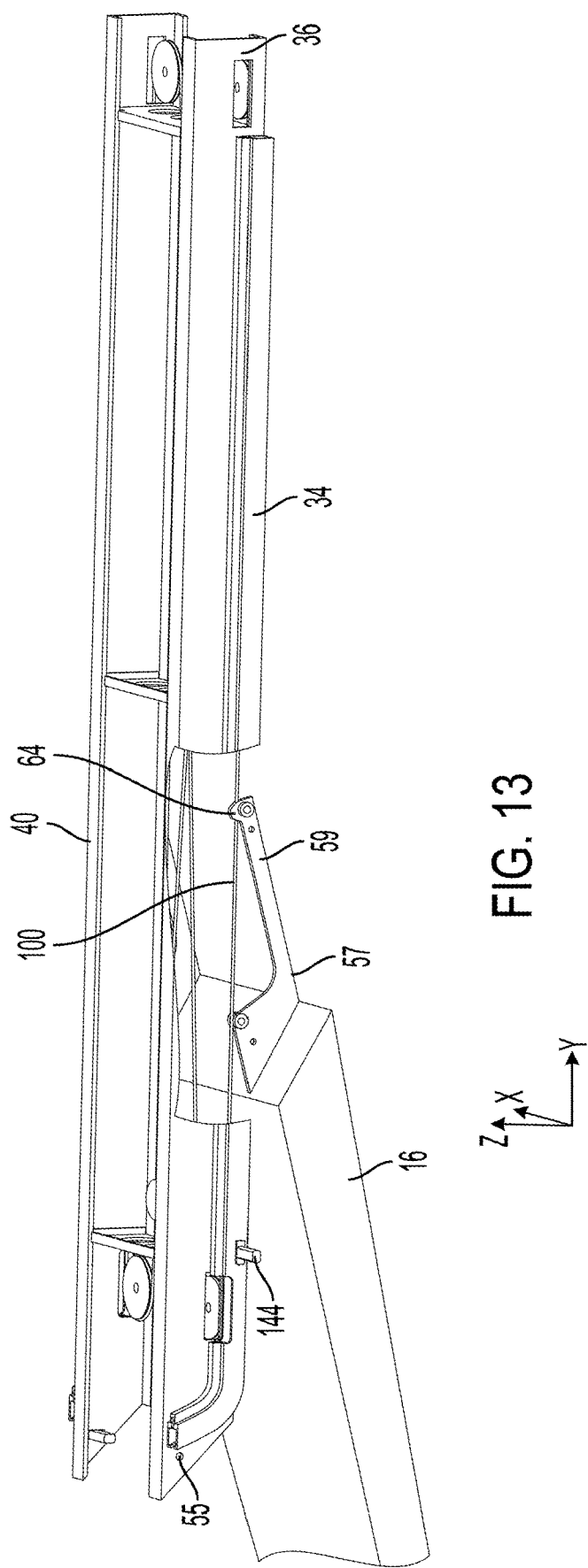
FIG. 13 is a partial view showing the wingtip in a middle position between the extended position and a stowed position under the fixed wing.
Figure 14:
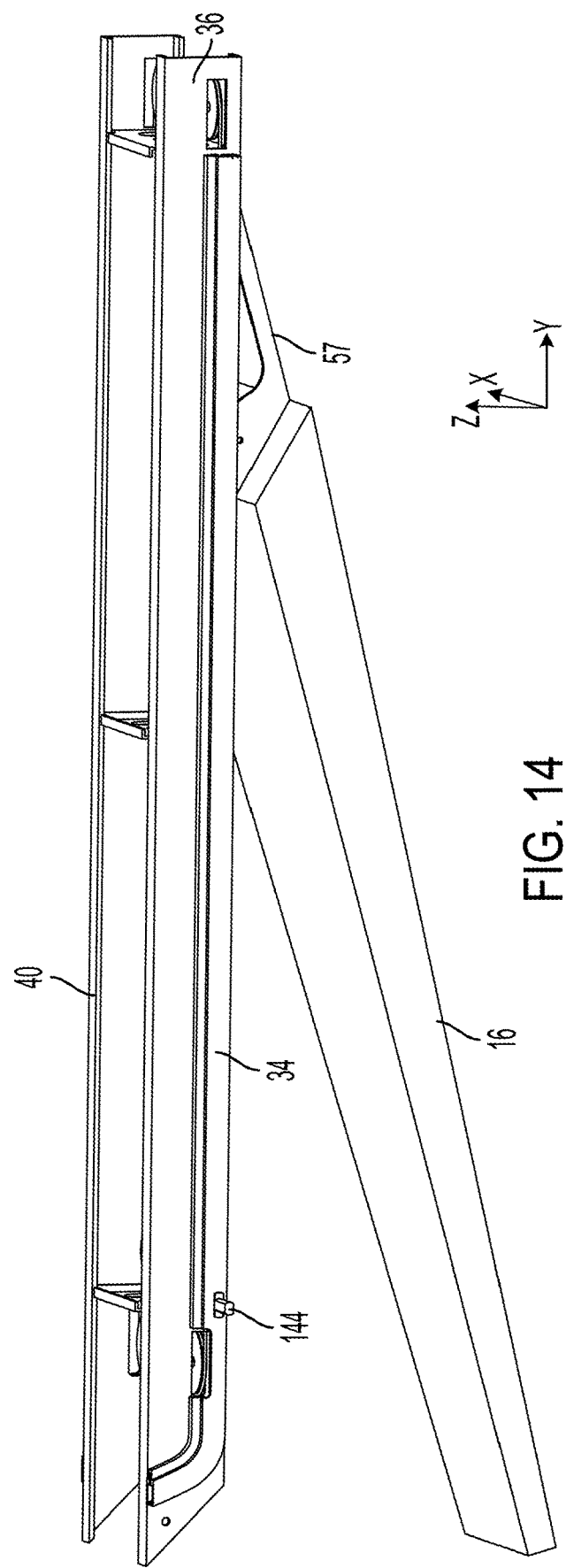
FIG. 14 is a partial view showing the wingtip in a stowed position under the fixed wing.

With reference now to FIGS. 3, 13, and 14, and as described in more detail below, a wingtip actuation assembly is configured to translate the first roller assembly within the first track 34 and the second roller assembly within the second track 38 to move the starboard wingtip 16 between the extended position of FIG. 3 and the stowed position under the fixed wing of FIG. 14. With reference now to FIGS. 7 and 8 showing the starboard wingtip 16 in the extended position, cross-section views of the first outboard roller pair 46 and first inboard roller pair 52 within the first track 34 are provided. FIG. 7 shows the first outer roller 48 and first inner roller 50 positioned on opposing sides of first bracket 57 within the first track 34. Similarly, FIG. 8 shows the first outer roller 54 and first inner roller 56 positioned on opposing sides of the first arm 59 of first bracket 57 within the first track 34. As illustrated in this figure, and with reference also to FIGS. 3, 9, and 12, the first track 34 and second track 38 have a rectangular cross section that forms an enclosure in which the first outboard roller pair 46 and the first inboard roller pair 52 can translate to guide the starboard wingtip 16 between extended and stowed positions.

Figure 4:
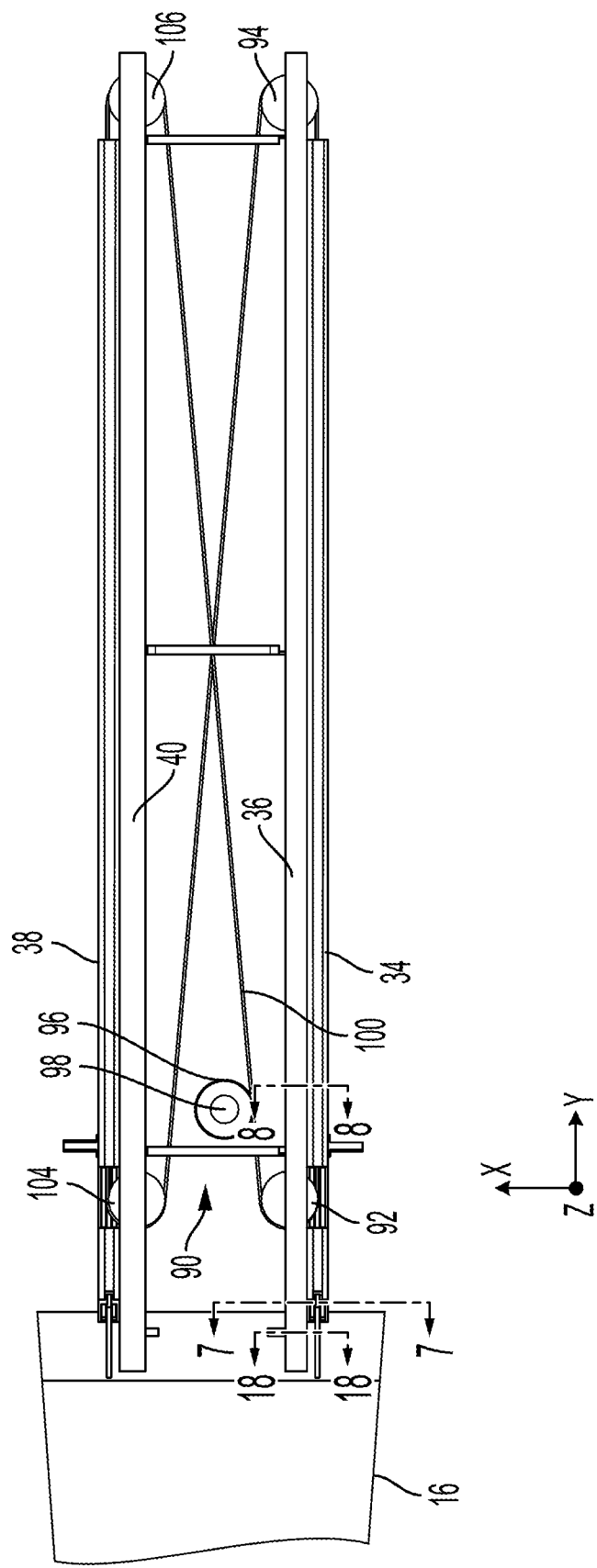
FIG. 4 is a partial top view of the fixed wing of FIG. 3 showing components of an apparatus configured to move the wingtip under the fixed wing according to one embodiment of the present disclosure.
Figure 5:
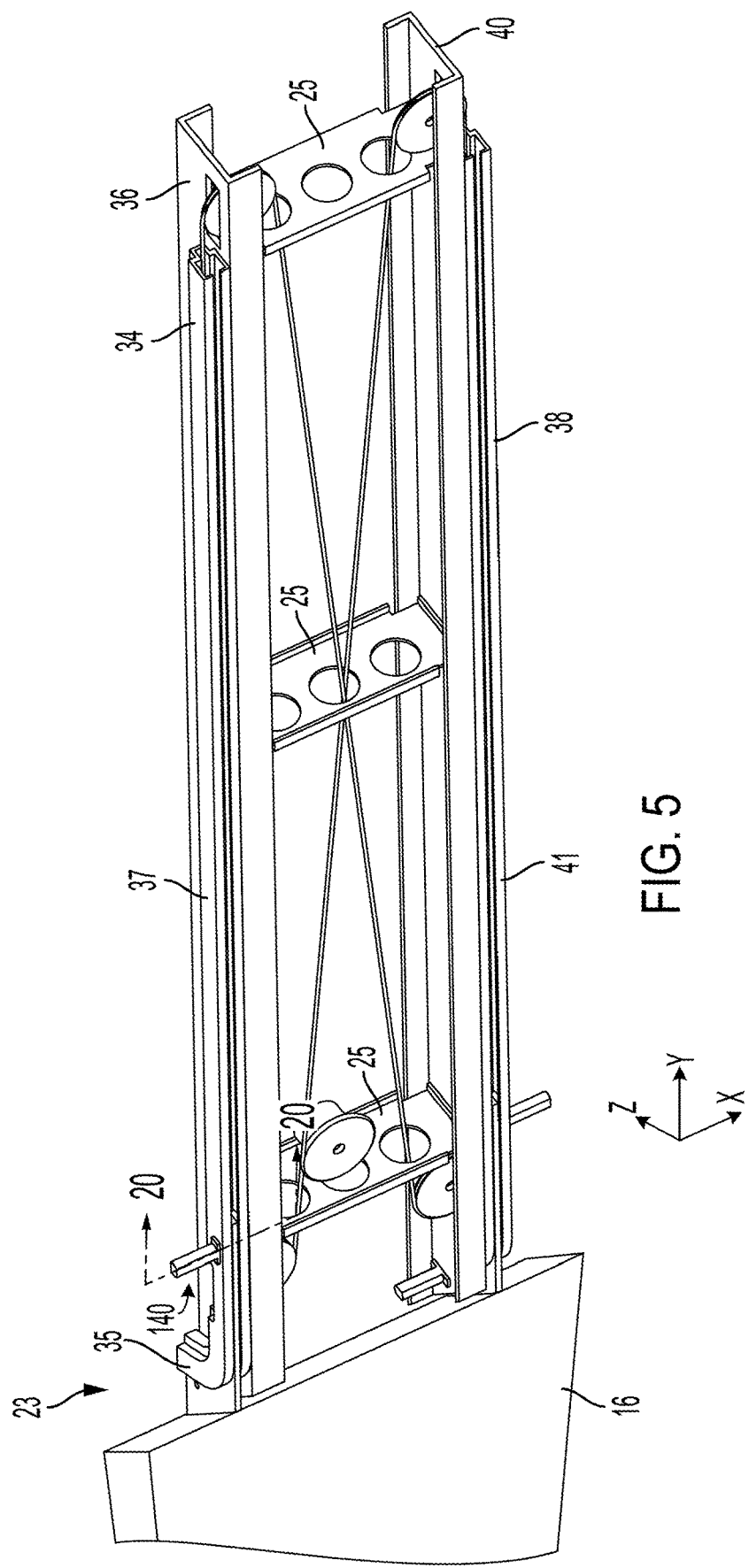
FIG. 5 is a partial bottom view of the fixed wing of FIG. 4.

As noted above and with reference to FIG. 4, a wingtip actuation assembly 90 is configured to translate the first roller assembly within the first track 34 and the second roller assembly within the second track 38. In the present example, the wingtip actuation assembly 90 comprises a first outboard pulley 92 and a second outboard pulley 104, a first inboard pulley 94 and a second inboard pulley 106, and a driven pulley 96 between the first outboard pulleys and the first inboard pulleys. The driven pulley 96 is powered by a motor 98 that is affixed to a motor support rib (not shown) spanning the first spar 36 and second spar 40. With reference also to FIGS. 5 and 6, a single cable 100 wraps around the driven pulley 96 and around the first and second inboard pulleys 94, 106 and the first and second outboard pulleys 92, 104. With reference to FIGS. 4-6, the cable 100 travels from first inboard pulley 94 to first outboard pulley 92 through an upper portion of the first track 34, and from second inboard pulley 106 to second outboard pulley 104 through an upper portion of the second track 38.

With reference now to FIGS. 11 and 13, in this example the cable 100 is fed through a first cable bore 101 in a tab 64 at the distal end 61 of the first arm 59 of the first bracket 57 and affixed to the first arm 59 at the first bore. In a similar manner, the cable 100 is fed through a second cable bore 103 in a tab 79 at the distal end 80 of the second arm 78 of the second bracket 74 and affixed to the second arm at the second bore. In this manner, and as depicted in FIGS. 3, 13, and 14, advancing the cable in a first direction causes the starboard wingtip 16 to be moved from the extended position to the stowed position, and advancing the cable in the opposite direction causes the wingtip to be moved from the stowed position to the extended position.

Figure 18:
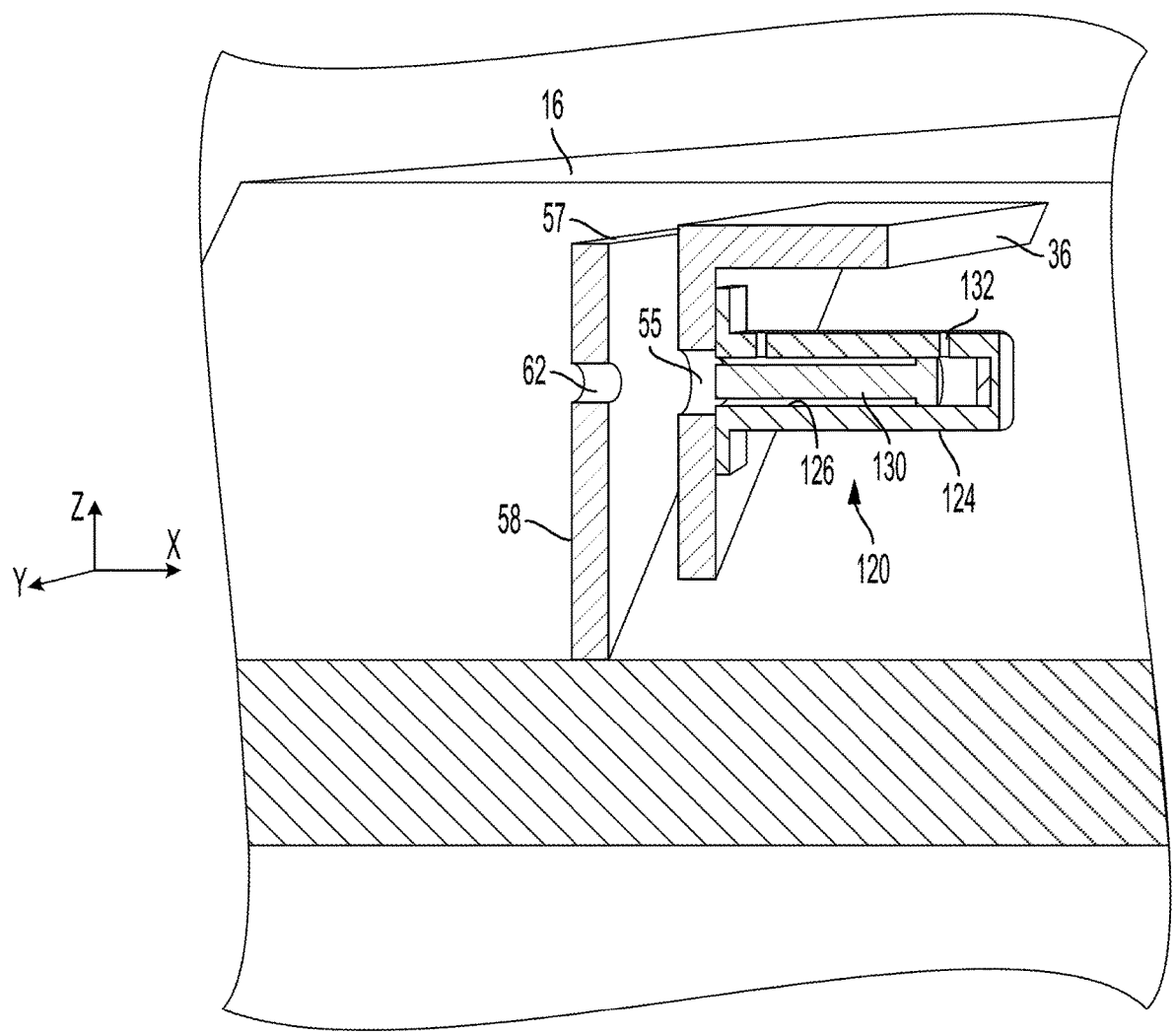
FIG. 18 is a cross-section view taken along line 18-18 in FIG. 4 showing a first latch pin assembly with a first latch pin in a retracted position.
Figure 19:
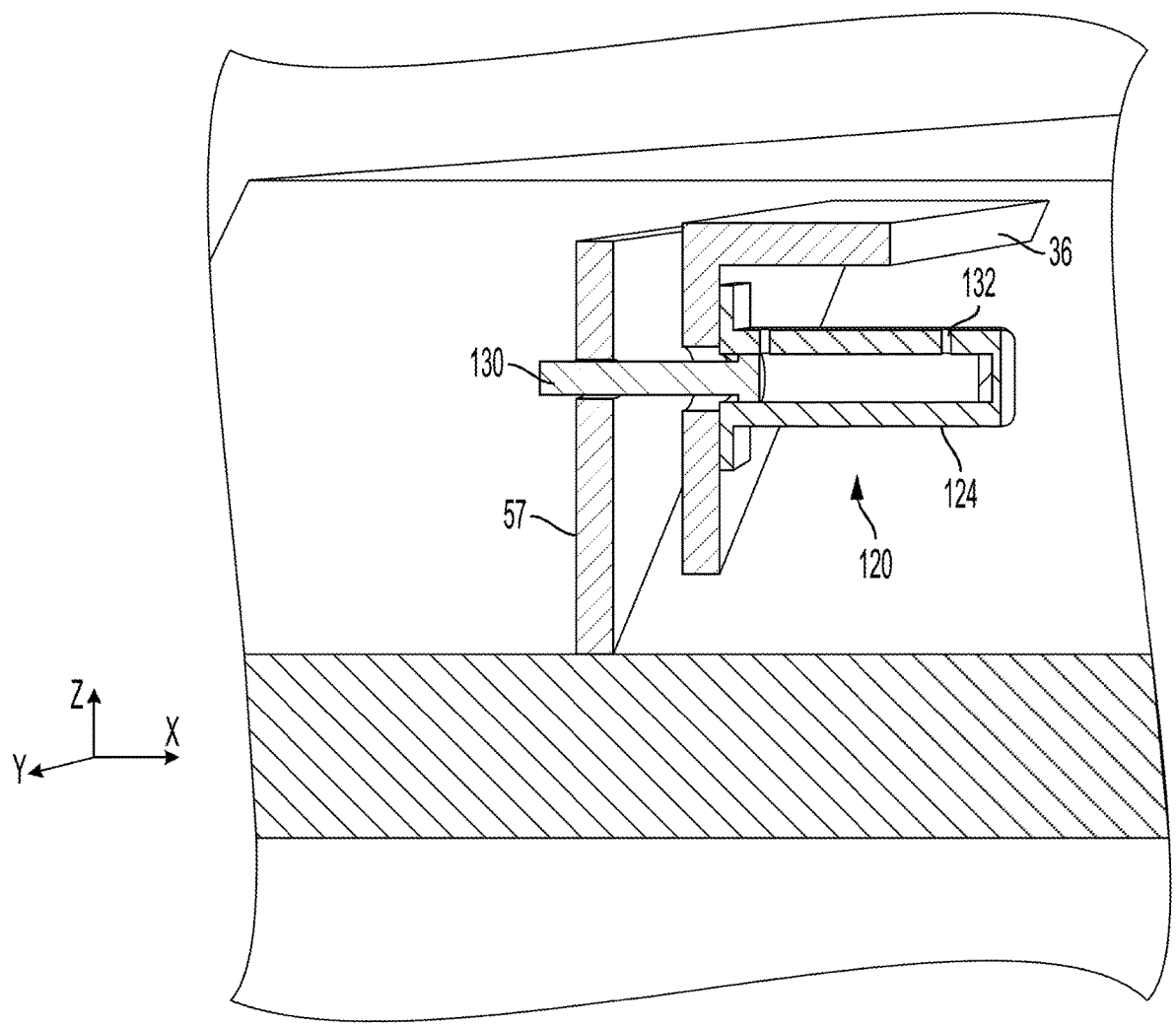
FIG. 19 shows the first latch pin assembly of FIG. 18 with the first latch pin in an extended position.

With reference now to FIGS. 5-8, 11, 18, and 19, the apparatus 30 includes a first latch pin assembly 120 configured to removably secure the first attachment end 58 of the first bracket 57 to the first spar 36 to releasably lock the starboard wingtip 16 in the extended position. In one potential advantage of the present disclosure, this feature ensures the wingtip remains securely oriented in the extended position when the aircraft is in flight. With reference to FIGS. 18 and 19, the first latch pin assembly 120 comprises a first latch pin 130 that is configured to move through a spar latch pin aperture 55 and into and out from an outboard bracket latch pin aperture 62 that is defined in the first attachment end 58 of the first bracket 57. As shown in FIG. 18, a first housing 124 of the latch pin assembly 120 includes a first bore 126 in which the first latch pin 130 is moveably retained. An intake/exhaust port 132 defined in the first housing 124 is fluidically coupled to a pressurized fluid source (not shown) to selectively extend and retract the latch pin 130. FIG. 19 shows the latch pin 130 in the actuated position that locks the first bracket 57 and attached starboard wingtip 16 in the extended position via the first spar 36.

Figure 20:
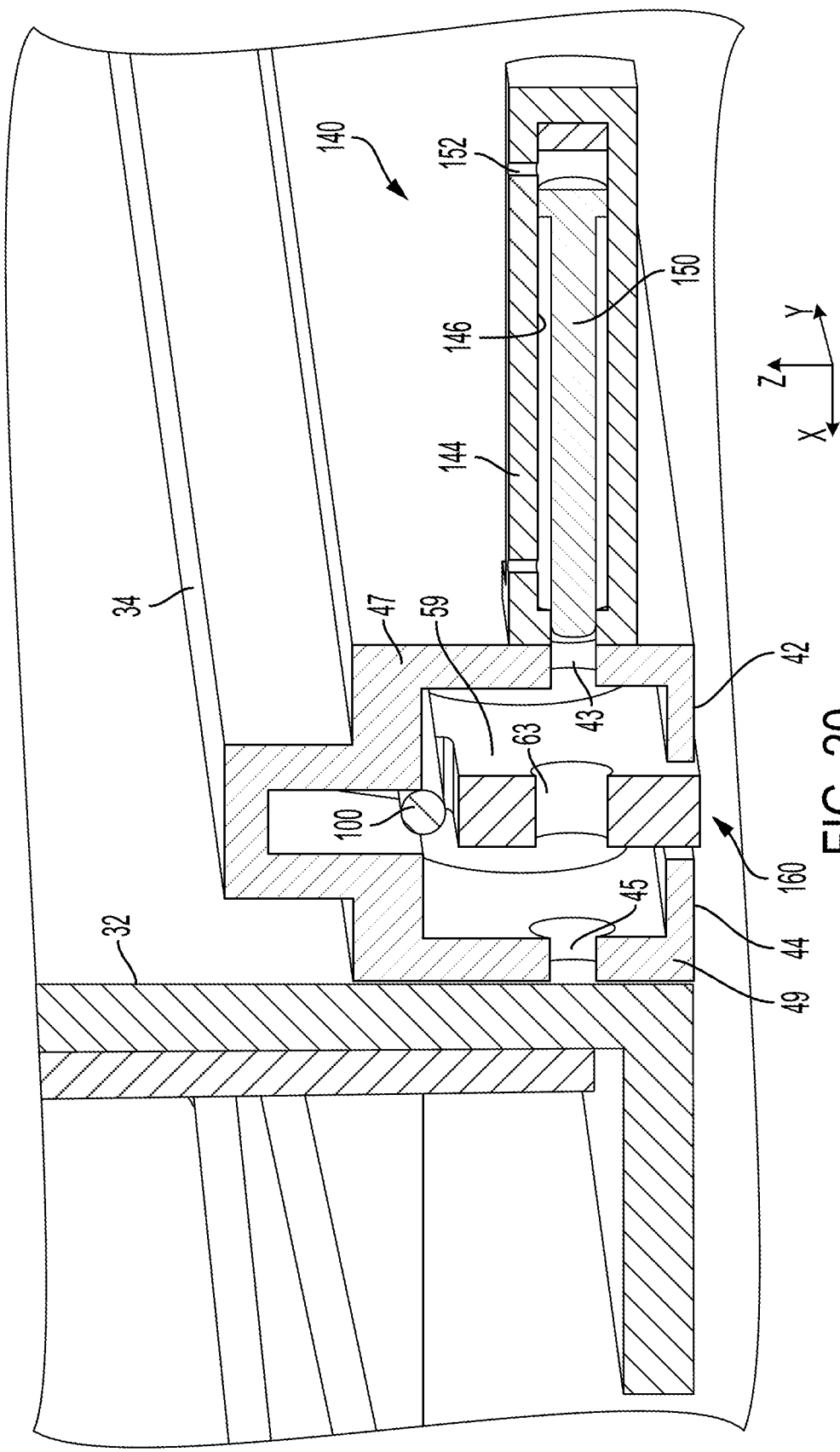
FIG. 20 is a cross-section view taken along line 20-20 in FIG. 5 showing a second latch pin assembly with a second latch pin in a retracted position.
Figure 21:
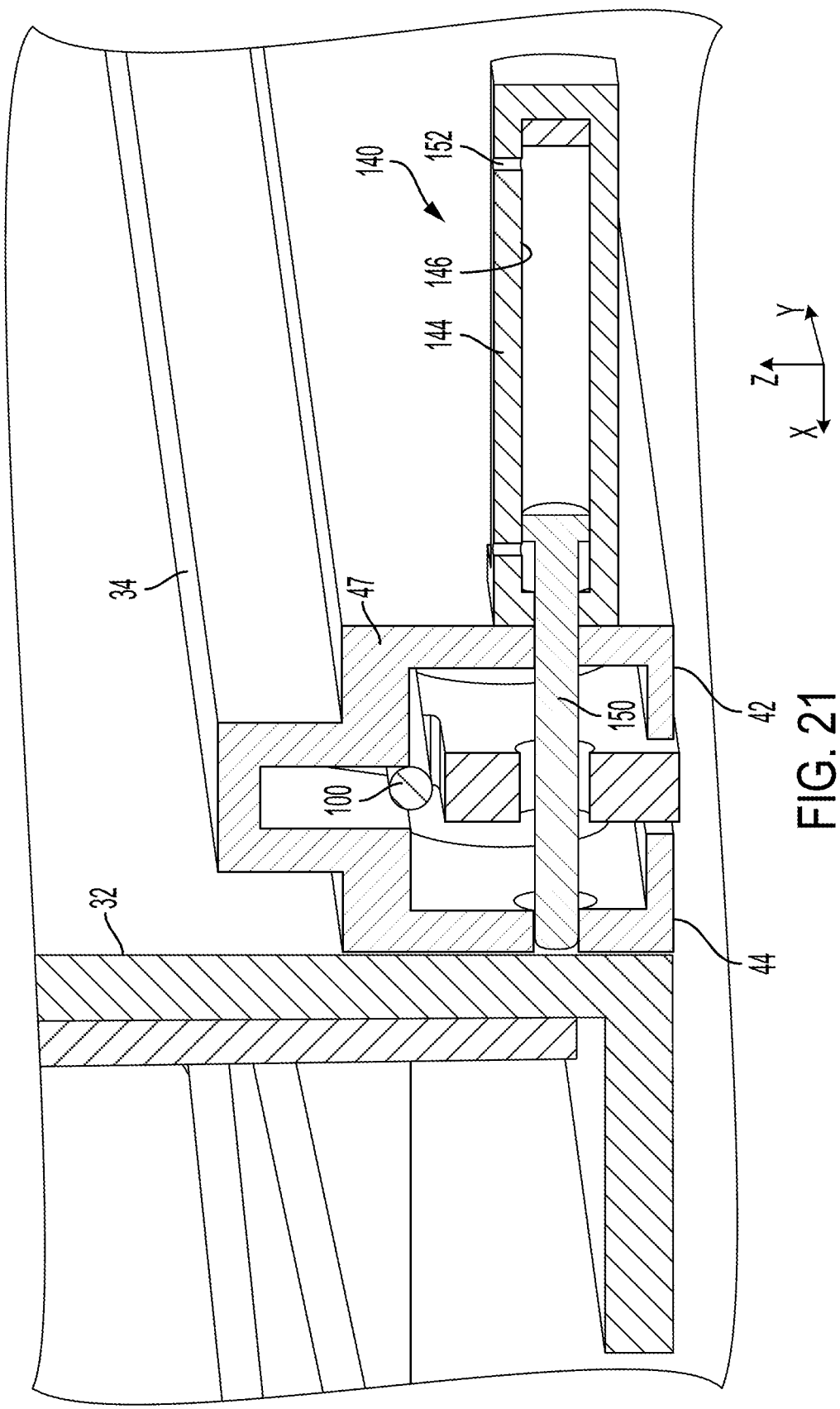
FIG. 21 shows the second latch pin assembly of FIG. 20 with the second latch pin in an extended position.

With reference now to FIGS. 5, 8, 20, and 21, the apparatus also includes a second latch pin assembly 140 that is also configured to removably secure the first bracket 57 to the first spar 36 to releasably lock the starboard wingtip 16 in the extended position. As shown in FIGS. 20 and 21, the second latch pin assembly 140 comprises a second latch pin 150 that is configured to move into and out from an inboard bracket latch pin aperture 63 that is defined in the distal end 61 of the first arm 59 of the first bracket 57. Additionally, the first track 34 includes an outer latch pin aperture 43 and an inner latch pin aperture 45 through which the second latch pin 150 can extend to releasably lock the starboard wingtip 16 in the extended position.

As shown in FIG. 20, a second housing 144 includes a second bore 146 in which the second latch pin 150 is moveably retained. An intake/exhaust port 152 defined in the second housing 144 is fluidically coupled to a pressurized fluid source (not shown) to selectively extend and retract the second latch pin 150. FIG. 21 shows the second latch pin 150 in the actuated position that locks the first bracket 57 and attached starboard wingtip 16 in the extended position via the first track 34 that is affixed to the sidewall 32 of the first spar 36.

Figure 15:
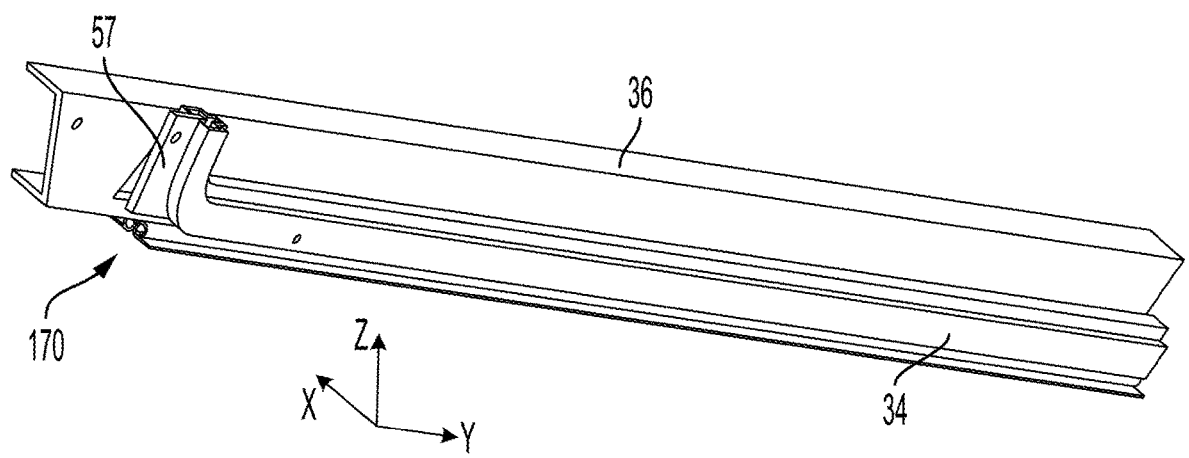
FIG. 15 shows a seal extending beneath a track to cover a slot in the track when the wingtip is in the extended position.
Figure 16:
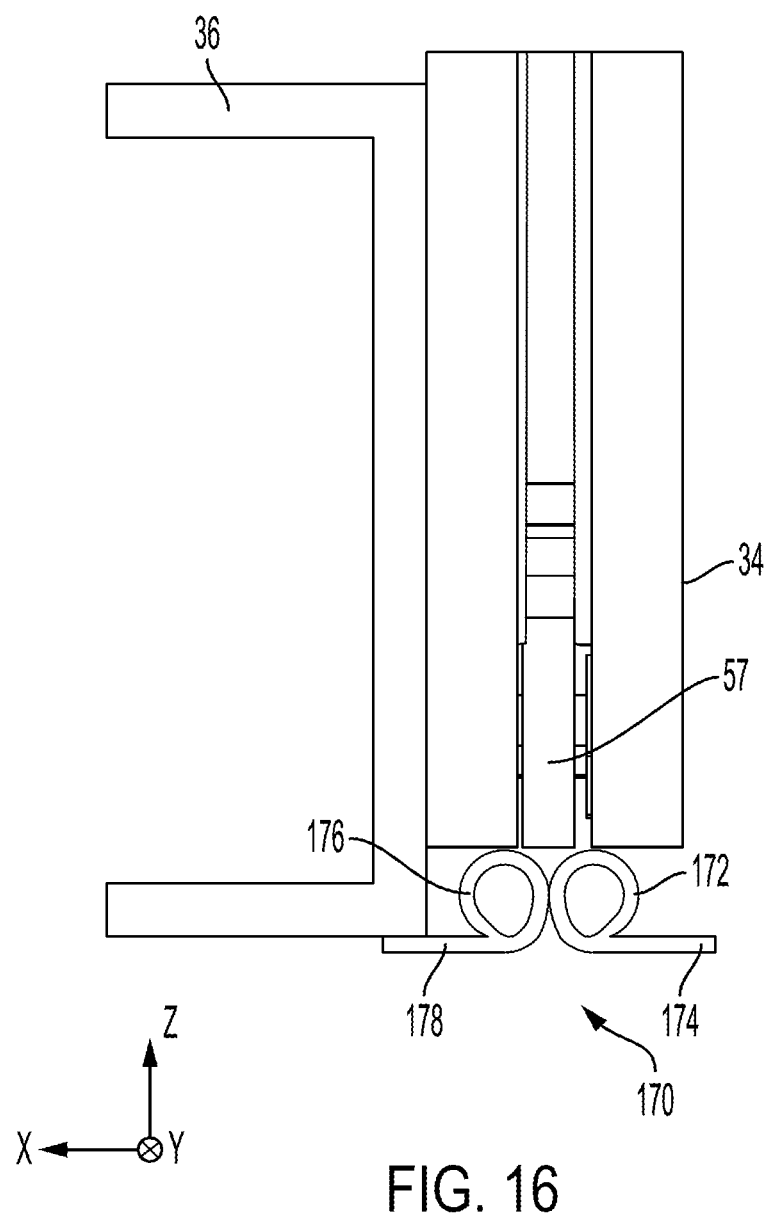
FIG. 16 shows an end view of the seal extending beneath the track of FIG. 15.

With reference again to FIG. 20, a first slot 160 is defined between the first bottom surface 42 and the second bottom surface 44 of the first track 34. With reference now to FIGS. 15 and 16, in this example a seal 170 is provided to cover the first slot 160 when the starboard wingtip 16 is in the extended position as shown in FIGS. 15 and 16. As depicted in FIG. 15, the seal 170 extends the length of the first slot 160 to cover the first slot.

Figure 10:
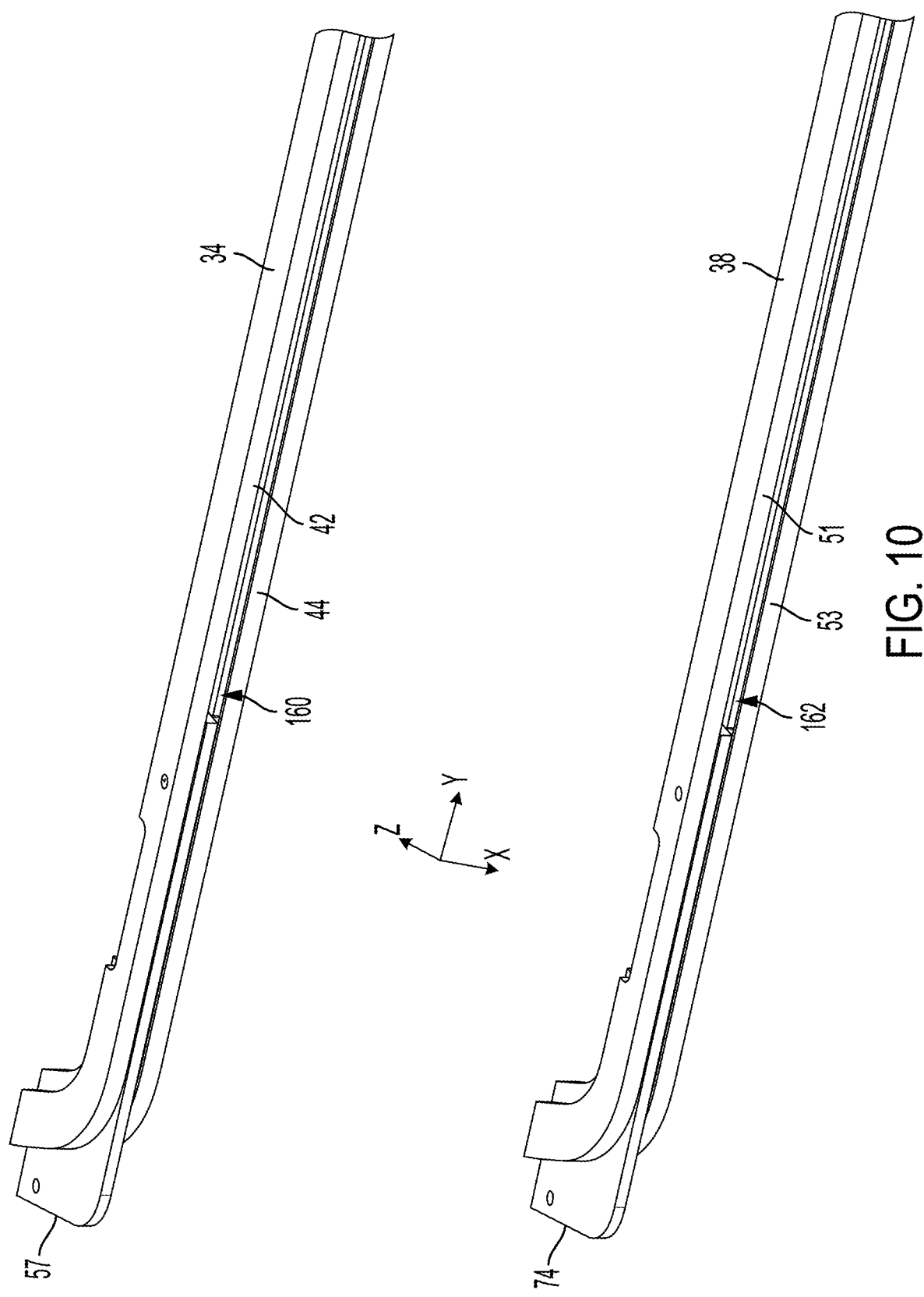
FIG. 10 shows a bottom view of the two tracks and brackets of the apparatus.
Figure 17:
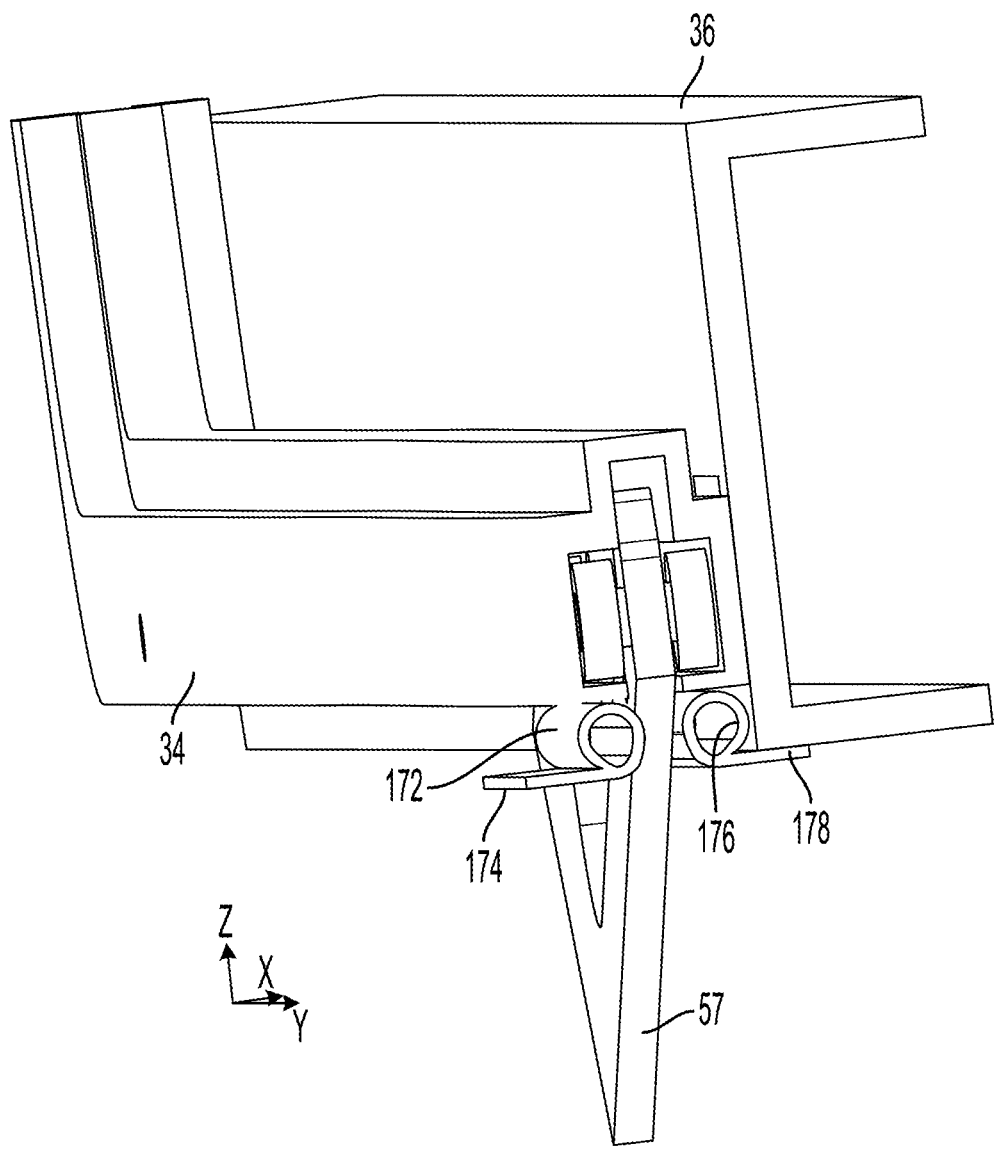
FIG. 17 shows a partial view of the seal opened to allow protrusion of the bracket when the wingtip is in the stowed position.

With reference to FIG. 16, in this example the seal 170 comprises an outer cylindrical portion 172 extending upwardly from an outer planar portion 174, and an inner cylindrical portion 176 extending upwardly from an inner planar portion 178. The outer cylindrical portion 172 and inner cylindrical portion 176 are biased into one another to create an airtight seal and prevent disruption of aerodynamic performance of the starboard fixed wing 14 during flight. As shown in FIG. 17, when the starboard wingtip 16 is moved into the stowed position, the first bracket 57 extends downwardly between the outer cylindrical portion 172 and inner cylindrical portion 176 of the seal 170. As shown in FIG. 10, the second track 38 similarly defines a second slot 162 between its first bottom surface 51 and second bottom surface 53, and a seal as described above is similarly provided to cover the second slot.

Figure 22:
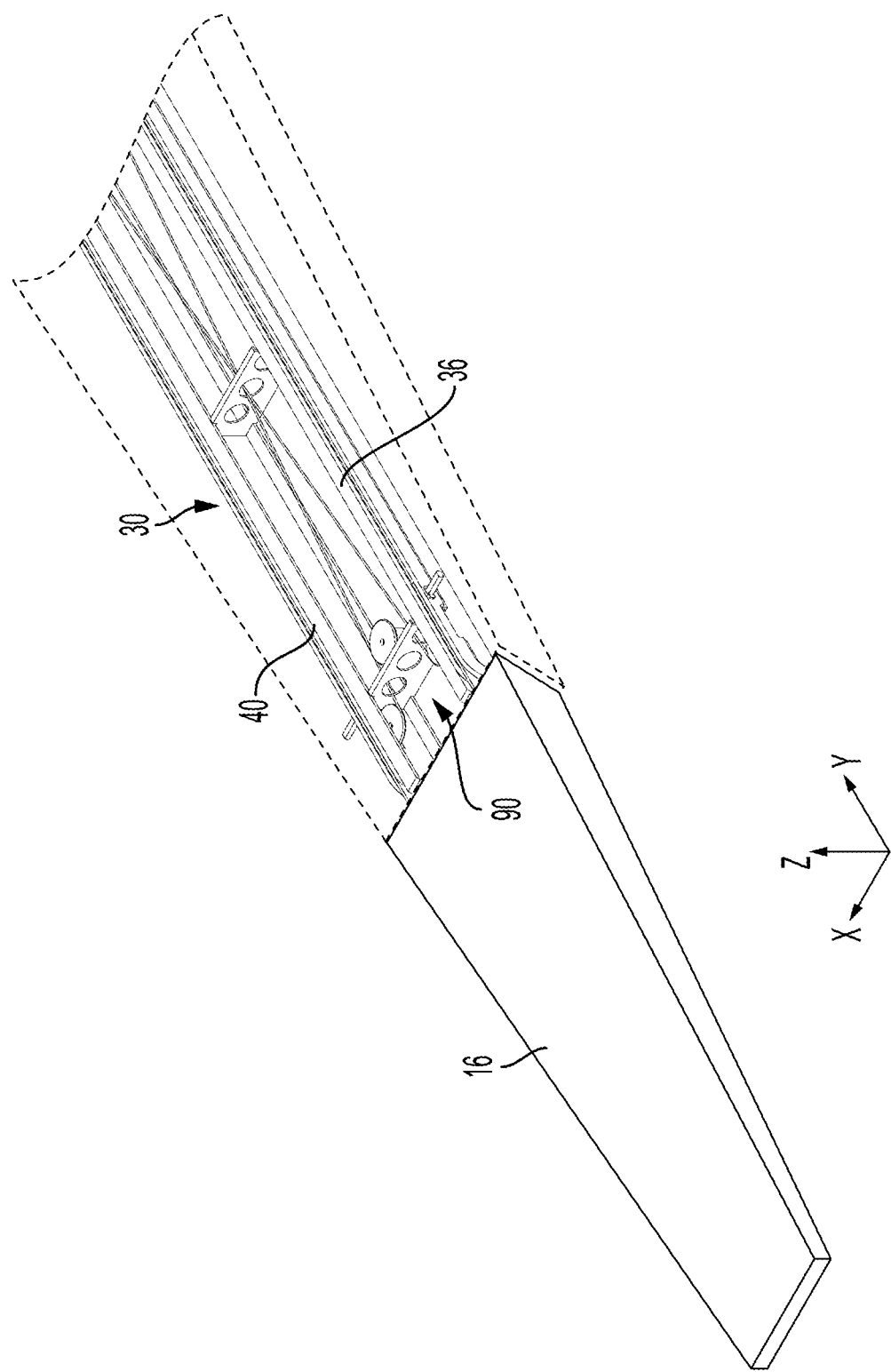
FIG. 22 shows another embodiment in which the apparatus is configured to move the wingtip over the fixed wing.
Figure 23:
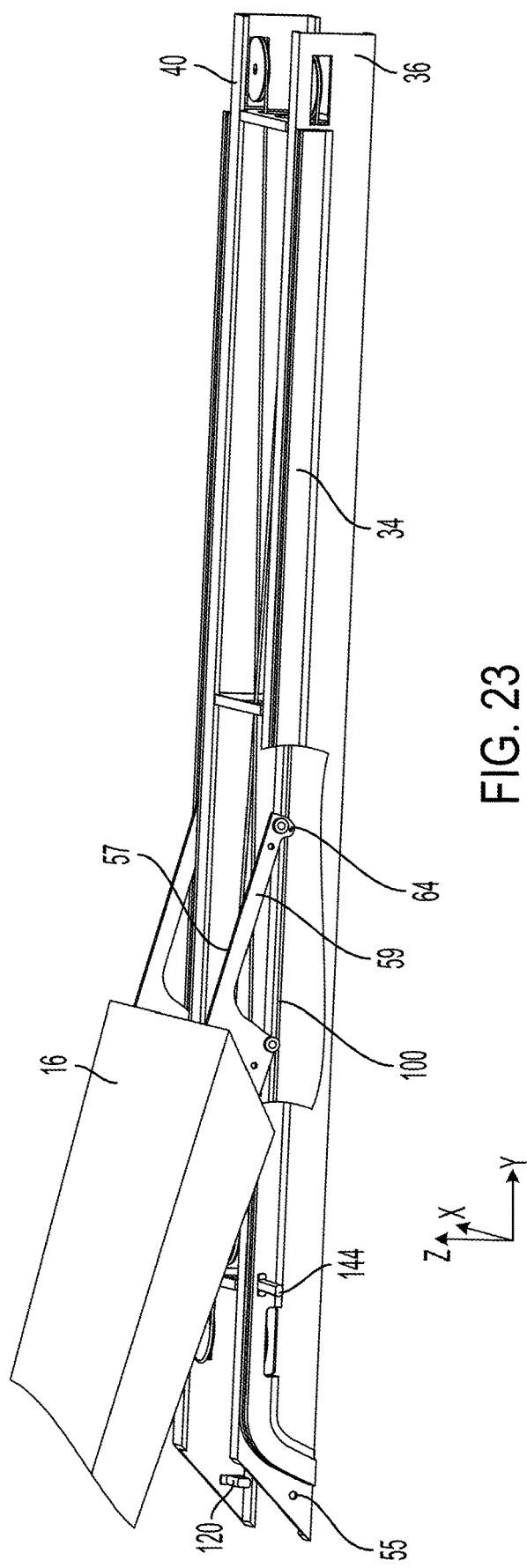
FIG. 23 is a partial view showing the wingtip in a middle position between the extended position and a stowed position above the fixed wing.
Figure 24:
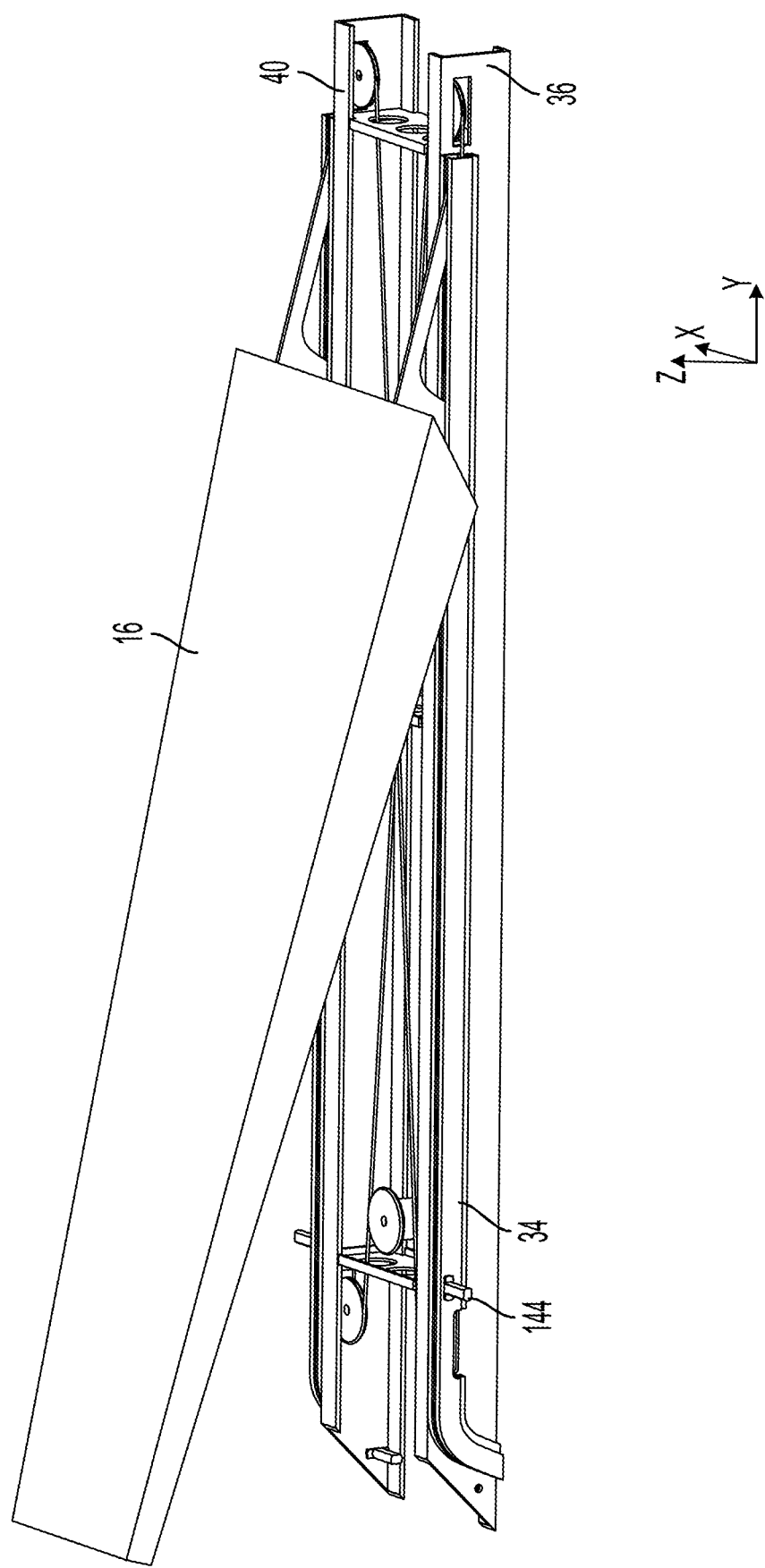
FIG. 24 is a partial view showing the wingtip in a stowed position above the fixed wing.

As noted above, the port fixed wing 22 and port wingtip 26 utilize the same mechanisms for moving the port wingtip 26 under the port fixed wing as described above for the starboard wingtip 16 and starboard fixed wing 14. Also as noted above, and with reference to FIGS. 22-24, in other configurations the apparatus 30 is configured to translate the first roller assembly within the first track 34 and the second roller assembly within the second track 38 to move the starboard wingtip 16 between the extended position of FIG. 22 and the stowed position above the fixed wing of FIG. 24.

FIG. 25 is a flowchart of an example method 200 of shortening a wingspan of an aircraft. The following description of method 200 is provided with reference to the components described herein and shown in FIGS. 1-21. In other examples, the method 200 is performed in other contexts using other suitable components.

At 204, the method 200 includes providing an apparatus configured to move a wingtip under a fixed wing of the aircraft, the apparatus comprising: a first track affixed to the fixed wing of the aircraft: a first roller assembly affixed to the wingtip of the aircraft, the first roller assembly moveably captured within the first track: a second track affixed to the fixed wing: and a second roller assembly affixed to the wingtip, the second roller assembly moveably captured within the second track. At 208 the method 200 includes positioning the wingtip at an outboard end of the fixed wing. At 212 the method 200 includes moving the wingtip under the fixed wing by moving the first roller assembly within the first track and moving the second roller assembly within the second track.

The concepts described herein are broadly applicable to any suitable type of aircraft, including conventional take-off & landing aircraft, short take-off & landing aircraft, short take-off & vertical landing aircraft, vertical take-off and landing aircraft, and manned and unmanned aircraft.

The present disclosure includes all novel and non-obvious combinations and sub-combinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

Further, the disclosure comprises configurations according to the following clauses.

Clause 1. An apparatus for shortening a wingspan of an aircraft, the apparatus comprising: a first track affixed to a fixed wing of the aircraft: a first roller assembly affixed to a wingtip of the aircraft, the first roller assembly moveably captured within the first track; a second track affixed to the fixed wing: a second roller assembly affixed to the wingtip, the second roller assembly moveably captured within the second track: and a wingtip actuation assembly configured to translate the first roller assembly within the first track and the second roller assembly within the second track to move the wingtip between an extended position and a stowed position.

Clause 2. The apparatus of claim 1, wherein the first track is affixed to a first spar of the fixed wing, and the second track is affixed to a second spar of the fixed wing.

Clause 3. The apparatus of claim 1, wherein the first roller assembly comprises: a first outboard roller pair; and a first inboard roller pair spaced from the first outboard roller pair.

Clause 4. The apparatus of claim 3, wherein the second roller assembly comprises: a second outboard roller pair: and a second inboard roller pair spaced from the second outboard roller pair.

Clause 5. The apparatus of claim 3, wherein the first roller assembly further comprises a first bracket affixed to an inboard end of the wingtip, wherein the first outboard roller pair and the first inboard roller pair are rotatably coupled to the first bracket.

Clause 6. The apparatus of claim 5, wherein the first bracket comprises: a first attachment end affixed to the inboard end of the wingtip; and a first arm extending from the first attachment end, wherein the first outboard roller pair is rotatably coupled to the first attachment end, and the first inboard roller pair is rotatably coupled to a distal end of the first arm.

Clause 7. The apparatus of claim 6, wherein the wingtip actuation assembly comprises: a first outboard pulley: a first inboard pulley spaced from the first outboard pulley: a driven pulley between the first outboard pulley and the first inboard pulley: and a cable wrapping around the driven pulley and around the first inboard pulley and the first outboard pulley, wherein the cable is affixed to the first arm of the first bracket.

Clause 8. The apparatus of claim 7, wherein the cable also wraps around a second inboard pulley and a second outboard pulley, and the cable is affixed to a second arm of a second bracket, wherein the second roller assembly comprises a second outboard roller pair and a second inboard roller pair that are rotatably coupled to the second bracket.

Clause 9. The apparatus of claim 6, further comprising a first latch pin assembly configured to removably secure the first attachment end of the first bracket to a first spar of the fixed wing to releasably lock the wingtip in the extended position, wherein the first latch pin assembly comprises a first latch pin configured to move into and out from an outboard bracket latch pin aperture defined in the first attachment end of the first bracket.

Clause 10. The apparatus of claim 9, further comprising a second latch pin assembly configured to removably secure the first bracket to the first spar of the fixed wing, wherein the second latch pin assembly comprises a second latch pin configured to move into and out from an inboard bracket latch pin aperture defined in the distal end of the first arm of the first bracket to releasably lock the wingtip in the extended position.

Clause 11. The apparatus of claim 1, wherein the first track and the second track each comprise: an upwardly-curving portion proximal to an outboard end of the fixed wing: and an elongated linear portion extending from the upwardly-curving portion toward a fuselage of the aircraft.

Clause 12. The apparatus of claim 11, wherein the elongated linear portions of the first track and the second track are parallel to one another.

Clause 13. The apparatus of claim 1, wherein a first slot is defined between a first bottom surface and a second bottom surface of the first track, the apparatus further comprising a seal extending a length of the first slot and configured to cover the first slot when the wingtip is in the extended position.

Clause 14. An aircraft, comprising: a fixed wing extending from a fuselage: a wingtip moveably coupled to a distal end of the fixed wing: and an apparatus configured to move the wingtip under the fixed wing, the apparatus comprising: a first track affixed to the fixed wing: a first roller assembly affixed to the wingtip, the first roller assembly moveably captured within the first track: a second track affixed to the fixed wing: a second roller assembly affixed to the wingtip, the second roller assembly moveably captured within the second track; and a wingtip actuation assembly configured to translate the first roller assembly within the first track and the second roller assembly within the second track to move the wingtip between an extended position and a stowed position.

Clause 15. The aircraft of claim 14, wherein the first track is affixed to a first spar of the fixed wing, and the second track is affixed to a second spar of the fixed wing.

Clause 16. The aircraft of claim 14, wherein the first roller assembly comprises: a first outboard roller pair; and a first inboard roller pair spaced from the first outboard roller pair.

Clause 17. The aircraft of claim 16, wherein the second roller assembly comprises: a second outboard roller pair: and a second inboard roller pair spaced from the second outboard roller pair.

Clause 18. The aircraft of claim 16, wherein the first roller assembly further comprises a first bracket affixed to an inboard end of the wingtip, wherein the first outboard roller pair and the first inboard roller pair are rotatably coupled to the first bracket.

Clause 19. The aircraft of claim 14, wherein the first track and the second track each comprise: an upwardly-curving portion proximal to an outboard end of the fixed wing: and an elongated linear portion extending from the upwardly-curving portion toward a fuselage of the aircraft.

Clause 20. A method of shortening a wingspan of an aircraft, the method comprising: providing an apparatus configured to move a wingtip under a fixed wing of the aircraft, the apparatus comprising: a first track affixed to the fixed wing of the aircraft: a first roller assembly affixed to the wingtip of the aircraft, the first roller assembly moveably captured within the first track: a second track affixed to the fixed wing: and a second roller assembly affixed to the wingtip, the second roller assembly moveably captured within the second track: positioning the wingtip at an outboard end of the fixed wing: and moving the wingtip under the fixed wing by moving the first roller assembly within the first track and moving the second roller assembly within the second track.

The invention claimed is:

1. An apparatus for shortening a wingspan of an aircraft, the apparatus comprising:
   a first track affixed to a fixed wing of the aircraft;
   a first roller assembly affixed to a wingtip of the aircraft, the first roller assembly moveably captured within the first track;
   a second track affixed to the fixed wing;
   a second roller assembly affixed to the wingtip, the second roller assembly moveably captured within the second track; and
   a wingtip actuation assembly configured to translate the first roller assembly within the first track and the second roller assembly within the second track to move the wingtip between an extended position and a stowed position by initially pivoting the wingtip and then translating the pivoted wingtip toward a fuselage of the aircraft.

2. The apparatus of claim 1, wherein the first track is affixed to a first spar of the fixed wing, and the second track is affixed to a second spar of the fixed wing.

3. The apparatus of claim 1, wherein the first roller assembly comprises:
   a first outboard roller pair; and
   a first inboard roller pair spaced from the first outboard roller pair.

4. The apparatus of claim 3, wherein the second roller assembly comprises:
   a second outboard roller pair; and
   a second inboard roller pair spaced from the second outboard roller pair.

5. The apparatus of claim 3, wherein the first roller assembly further comprises a first bracket affixed to an inboard end of the wingtip, wherein the first outboard roller pair and the first inboard roller pair are rotatably coupled to the first bracket.

6. The apparatus of claim 5, wherein the first bracket comprises:
   a first attachment end affixed to the inboard end of the wingtip; and
   a first arm extending from the first attachment end, wherein the first outboard roller pair is rotatably coupled to the first attachment end, and the first inboard roller pair is rotatably coupled to a distal end of the first arm.

7. The apparatus of claim 6, wherein the wingtip actuation assembly comprises:
   a first outboard pulley;
   a first inboard pulley spaced from the first outboard pulley;
   a driven pulley between the first outboard pulley and the first inboard pulley; and
   a cable wrapping around the driven pulley and around the first inboard pulley and the first outboard pulley, wherein the cable is affixed to the first arm of the first bracket.

8. The apparatus of claim 7, wherein the cable also wraps around a second inboard pulley and a second outboard pulley, and the cable is affixed to a second arm of a second bracket, wherein the second roller assembly comprises a second outboard roller pair and a second inboard roller pair that are rotatably coupled to the second bracket.

9. The apparatus of claim 6, further comprising a first latch pin assembly configured to removably secure the first attachment end of the first bracket to a first spar of the fixed wing to releasably lock the wingtip in the extended position, wherein the first latch pin assembly comprises a first latch pin configured to move into and out from an outboard bracket latch pin aperture defined in the first attachment end of the first bracket.

10. The apparatus of claim 9, further comprising a second latch pin assembly configured to removably secure the first bracket to the first spar of the fixed wing, wherein the second latch pin assembly comprises a second latch pin configured to move into and out from an inboard bracket latch pin aperture defined in the distal end of the first arm of the first bracket to releasably lock the wingtip in the extended position.

11. The apparatus of claim 1, wherein the first track and the second track each comprise:
    an upwardly-curving portion proximal to an outboard end of the fixed wing; and
    an elongated linear portion extending from the upwardly-curving portion toward the fuselage of the aircraft.

12. The apparatus of claim 11, wherein the elongated linear portions of the first track and the second track are parallel to one another.

13. The apparatus of claim 1, wherein a first slot is defined between a first bottom surface and a second bottom surface of the first track, the apparatus further comprising a seal extending a length of the first slot and configured to cover the first slot when the wingtip is in the extended position.

14. An aircraft, comprising:
    a fixed wing extending from a fuselage;
    a wingtip moveably coupled to a distal end of the fixed wing; and
    an apparatus configured to move the wingtip under the fixed wing, the apparatus comprising:
      a first track affixed to the fixed wing;
      a first roller assembly affixed to the wingtip, the first roller assembly moveably captured within the first track;
      a second track affixed to the fixed wing;
      a second roller assembly affixed to the wingtip, the second roller assembly moveably captured within the second track; and
      a wingtip actuation assembly configured to translate the first roller assembly within the first track and the second roller assembly within the second track to move the wingtip between an extended position and a stowed position by initially pivoting the wingtip and then translating the pivoted wingtip toward the fuselage of the aircraft.

15. The aircraft of claim 14, wherein the first track is affixed to a first spar of the fixed wing, and the second track is affixed to a second spar of the fixed wing.

16. The aircraft of claim 14, wherein the first roller assembly comprises:
    a first outboard roller pair; and
    a first inboard roller pair spaced from the first outboard roller pair.

17. The aircraft of claim 16, wherein the second roller assembly comprises:
    a second outboard roller pair; and
    a second inboard roller pair spaced from the second outboard roller pair.

18. The aircraft of claim 16, wherein the first roller assembly further comprises a first bracket affixed to an inboard end of the wingtip, wherein the first outboard roller pair and the first inboard roller pair are rotatably coupled to the first bracket.

19. The aircraft of claim 14, wherein the first track and the second track each comprise:
   an upwardly-curving portion proximal to an outboard end of the fixed wing; and
   an elongated linear portion extending from the upwardly-curving portion toward the fuselage of the aircraft.

20. A method of shortening a wingspan of an aircraft, the method comprising:
   providing an apparatus configured to move a wingtip under a fixed wing of the aircraft, the apparatus comprising:
      a first track affixed to the fixed wing of the aircraft;
      a first roller assembly affixed to the wingtip of the aircraft, the first roller assembly moveably captured within the first track;
      a second track affixed to the fixed wing; and
      a second roller assembly affixed to the wingtip, the second roller assembly moveably captured within the second track;
   positioning the wingtip at an outboard end of the fixed wing; and
   moving the wingtip under the fixed wing by moving the first roller assembly within the first track and moving the second roller assembly within the second track, and by initially pivoting the wingtip and then translating the pivoted wingtip toward a fuselage of the aircraft.

* * * * *

UNITED STATES PATENT AND TRADEMARK OFFICE
CERTIFICATE OF CORRECTION

PATENT NO. : 12,157,566 B2
APPLICATION NO. : 18/073403
DATED : December 3, 2024
INVENTOR(S) : Keily Madison Gleason-Chapell, Mark Steven Good and Paul Dees Page 1 of 1

It is certified that error appears in the above-identified patent and that said Letters Patent is hereby corrected as shown below:

On the Title Page

Item (73), Assignee, delete "The Boenig Company" and insert --The Boeing Company--

Signed and Sealed this
Seventh Day of January, 2025

Derrick Brent
*Acting Director of the United States Patent and Trademark Office*